(12) United States Patent
Okojie

(10) Patent No.: US 7,438,030 B1
(45) Date of Patent: Oct. 21, 2008

(54) ACTUATOR OPERATED MICROVALVES

(75) Inventor: Robert S. Okojie, Strongsville, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 141 days.

(21) Appl. No.: 11/213,604

(22) Filed: Aug. 26, 2005

(51) Int. Cl.
*F01L 9/04* (2006.01)
(52) U.S. Cl. .................................. 123/90.11; 251/11
(58) Field of Classification Search ............ 251/11, 251/129.01, 61; 123/90.11
See application file for complete search history.

(56) References Cited

U.S. PATENT DOCUMENTS

| | | | |
|---|---|---|---|
| 4,537,673 A | 8/1985 | Asawa et al. | |
| 4,812,199 A * | 3/1989 | Sickafus | 216/2 |
| 5,209,118 A * | 5/1993 | Jerman | 73/715 |
| 5,452,878 A | 9/1995 | Gravesen et al. | |
| 5,897,097 A | 4/1999 | Biegelsen et al. | |
| 5,901,939 A | 5/1999 | Cabuz et al. | |
| 5,941,501 A | 8/1999 | Biegelsen et al. | |
| 6,032,923 A | 3/2000 | Biegelsen et al. | |
| 6,089,534 A | 7/2000 | Biegelsen et al. | |
| 6,126,140 A | 10/2000 | Johnson et al. | |
| 6,158,712 A | 12/2000 | Craig | |
| 6,278,379 B1 | 8/2001 | Allen et al. | |
| 6,306,773 B1 * | 10/2001 | Adås et al. | 438/745 |
| 6,312,107 B1 | 11/2001 | Silverbrook | |
| 6,358,021 B1 | 3/2002 | Cabuz | |
| 6,386,507 B2 | 5/2002 | Dhuler et al. | |
| 6,505,811 B1 | 1/2003 | Barron et al. | |
| 6,511,915 B2 | 1/2003 | Mlcak | |
| 6,557,820 B2 | 5/2003 | Wetzel et al. | |
| 6,561,479 B1 | 5/2003 | Eldridge | |
| 6,590,267 B1 | 7/2003 | Goodwin-Johansson et al. | |
| 6,592,098 B2 | 7/2003 | Kao et al. | |
| 6,612,535 B1 | 9/2003 | Tai et al. | |
| 6,651,953 B2 | 11/2003 | Weldon | |
| 6,672,325 B2 | 1/2004 | Eldridge | |
| 6,688,853 B1 | 2/2004 | Burkett et al. | |
| 6,706,549 B1 | 3/2004 | Okojie | |
| 6,763,699 B1 | 7/2004 | Hunter et al. | |
| 6,774,337 B2 | 8/2004 | Claydon et al. | |
| 6,788,795 B2 | 9/2004 | Scheeper et al. | |
| 6,830,229 B2 | 12/2004 | Wetzel et al. | |
| 6,837,112 B2 | 1/2005 | Ferran et al. | |
| 6,845,664 B1 | 1/2005 | Okojie | |

(Continued)

*Primary Examiner*—Zelalem Eshete
(74) *Attorney, Agent, or Firm*—Woodling, Krost, and Rust

(57) ABSTRACT

An actuator operated microvalve and the method of making same is disclosed and claimed. The microvalve comprises a SiC housing which includes a first lower portion and a second upper portion. The lower portion of the SiC housing includes a passageway therethrough, a microvalve seat, and a moveable SiC diaphragm. The SiC diaphragm includes a centrally located boss and radially extending corrugations which may be sinusoidally shaped. The boss of the SiC diaphragm moves and modulates in a range of positions between a closed position wherein the boss interengages said microvalve seat prohibiting communication of fluid through the passageway and a fully open position when the boss is spaced apart from the seat at its maximum permitting communication of fluid through said passageway. The actuator includes a SiC top plate affixed to the boss of the diaphragm and a first electrode and the second upper portion of the SiC housing further includes a second electrode.

50 Claims, 23 Drawing Sheets

U.S. PATENT DOCUMENTS

| | | |
|---|---|---|
| 6,883,774 B2 * | 4/2005 | Nielsen et al. ................. 251/11 |
| 6,912,759 B2 | 7/2005 | Izadnegahdar et al. |
| 6,925,213 B2 | 8/2005 | Boyd et al. |
| 2002/0125790 A1 | 9/2002 | Horning et al. |
| 2002/0127760 A1 | 9/2002 | Yeh et al. |
| 2003/0108830 A1 | 6/2003 | Jacobsen et al. |
| 2005/0081621 A1 | 4/2005 | Zobel et al. |
| 2005/0098749 A1 | 5/2005 | Claydon et al. |

* cited by examiner

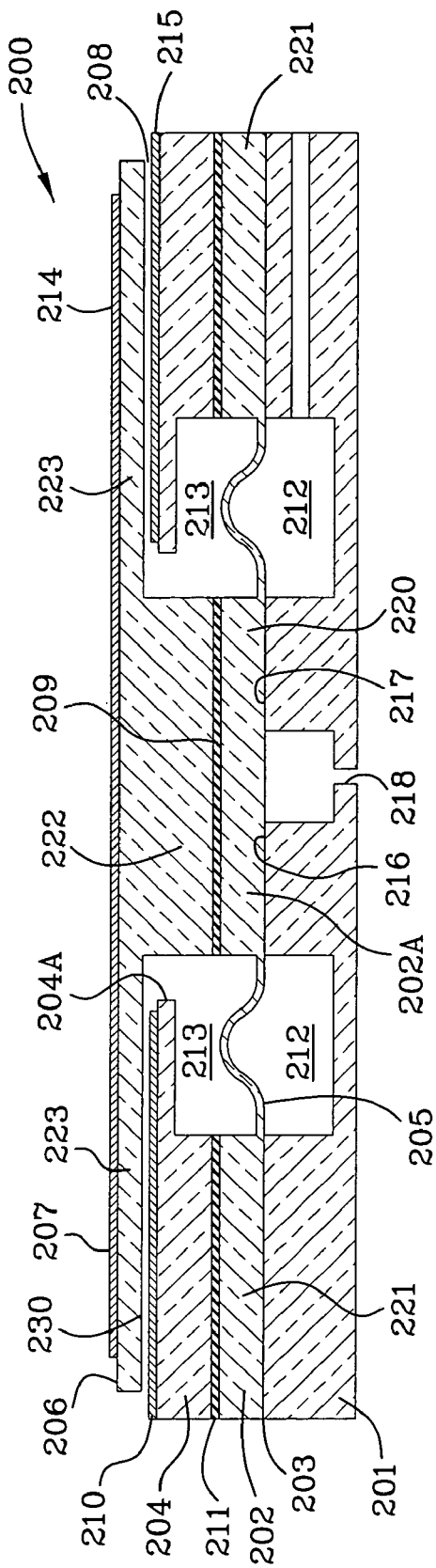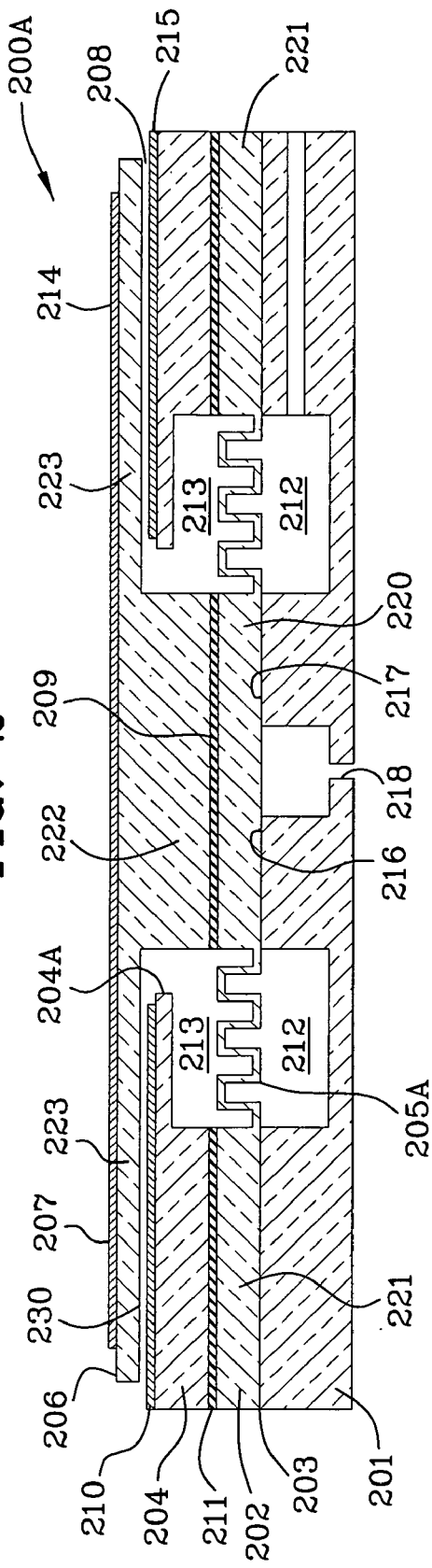

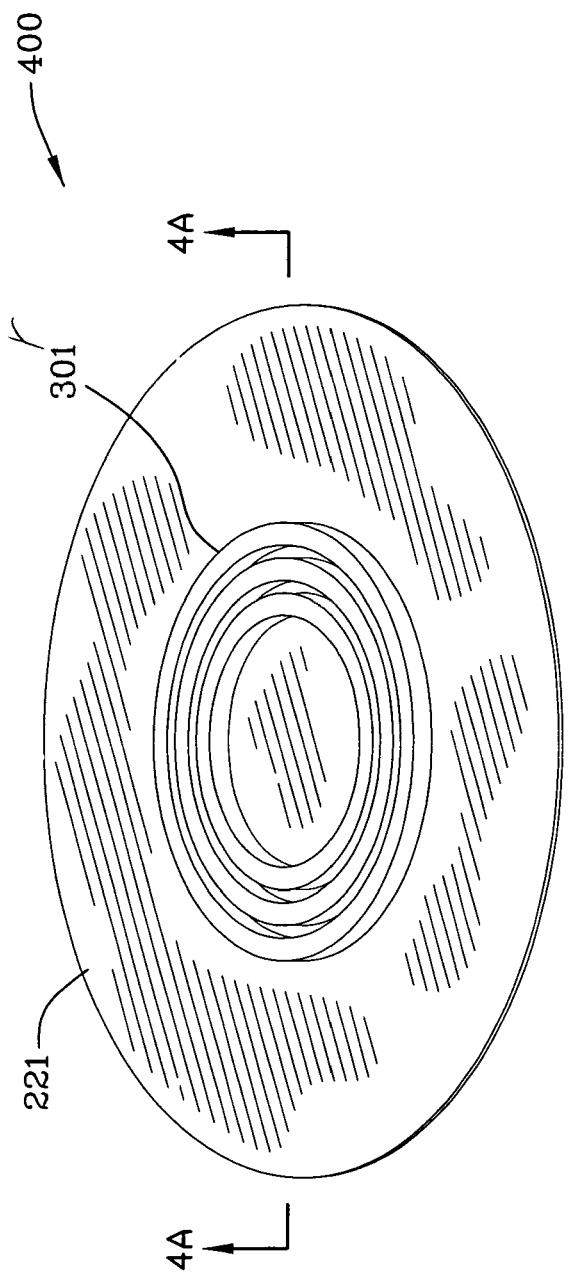
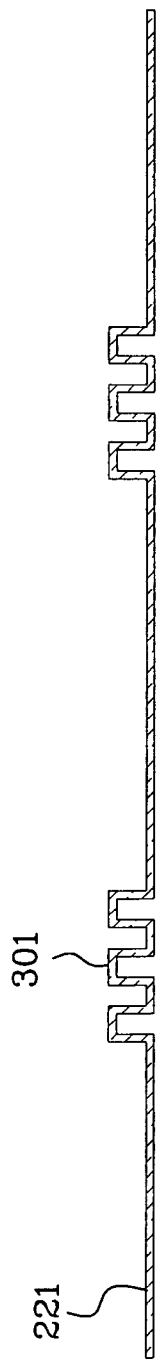
FIG. 4
FIG. 4A

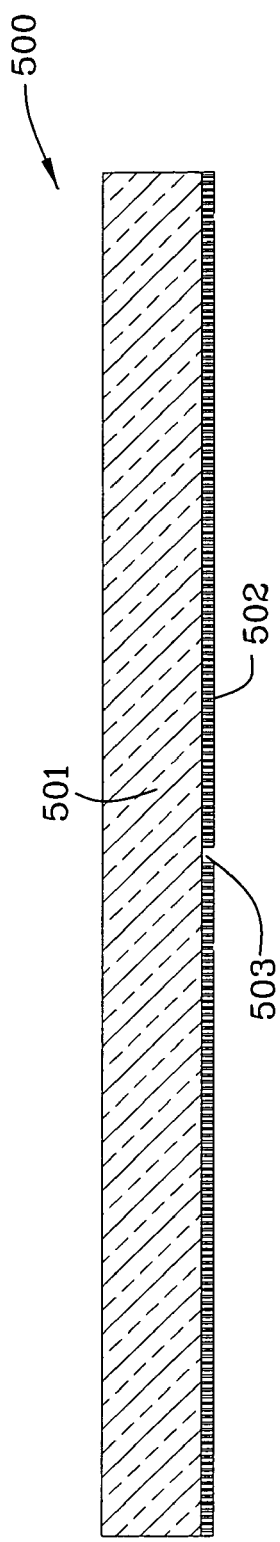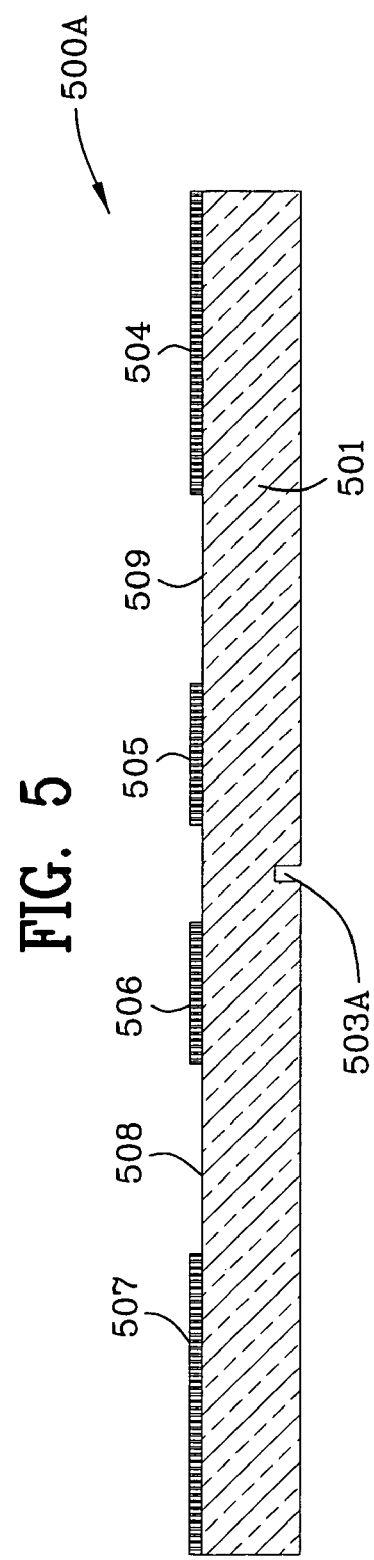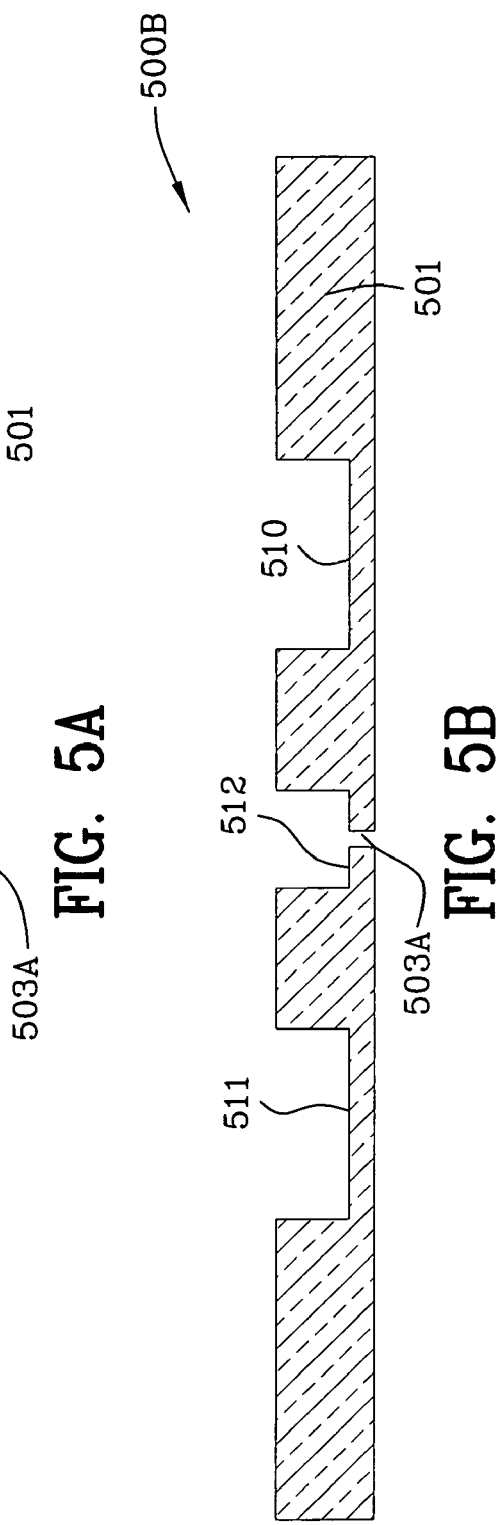

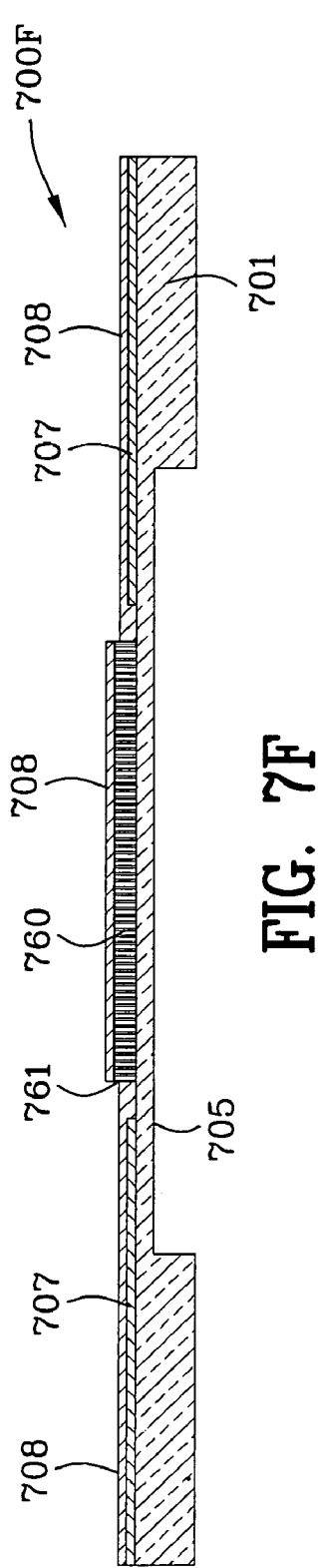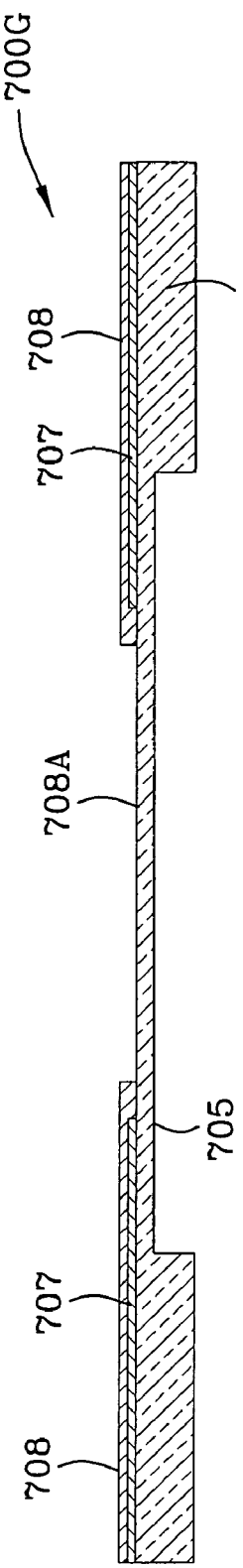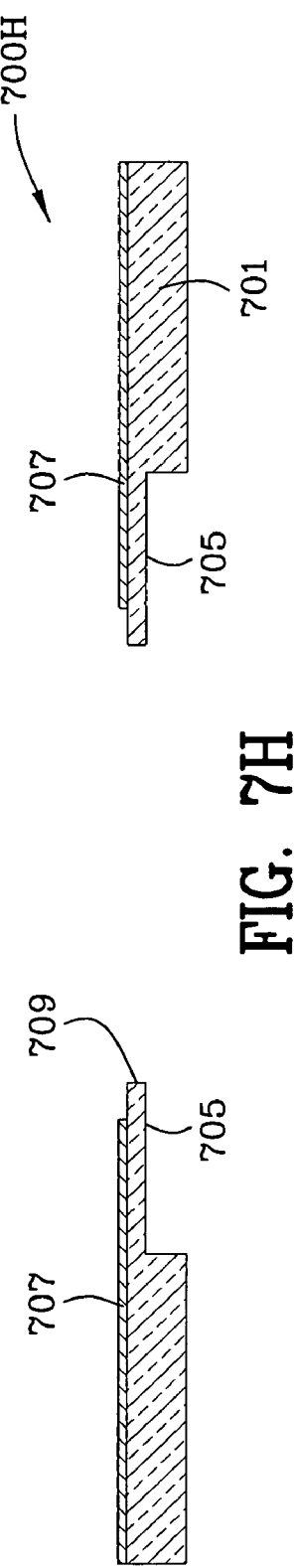

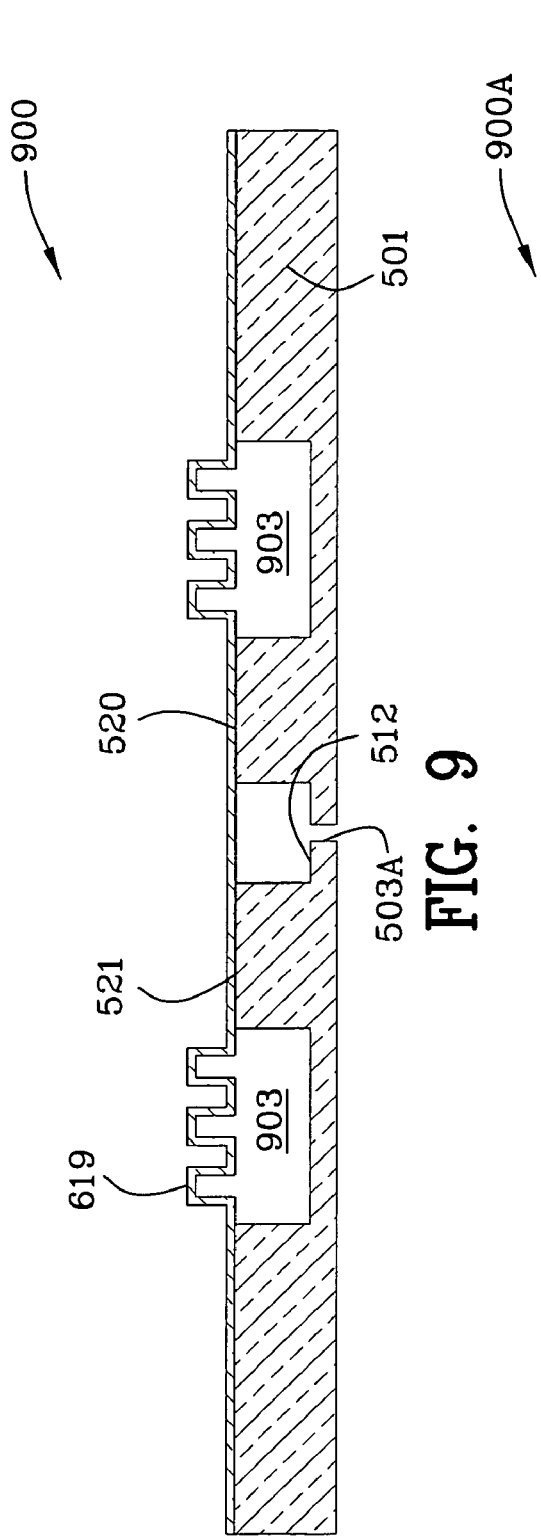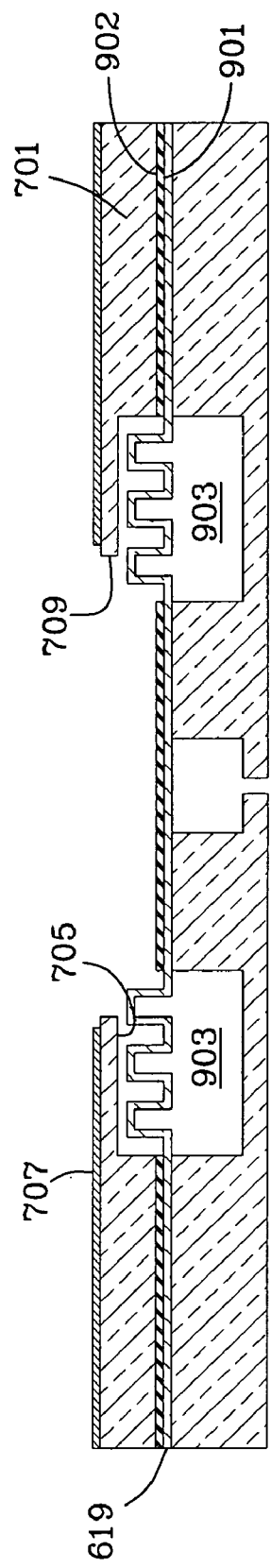

ACTUATOR OPERATED MICROVALVES

ORIGIN OF THE INVENTION

The invention described herein was made by an employee of the United States Government, and may be manufactured and used by the government for government purposes without the payment of any royalties therein and therefor.

FIELD OF THE INVENTION

The invention is in the field of actuator operated microvalves used primarily in combustion processes.

BACKGROUND OF THE INVENTION

My U.S. Pat. No. 6,706,549 B1 entitled MULTI-FUNCTIONAL MICRO ELECTROMECHANICAL DEVICES AND METHOD OF BULK MANUFACTURING SAME discloses and claims a method of bulk manufacturing SiC sensors, including pressure sensors and accelerometers.

My U.S. Pat. No. 6,845,664 B1 entitled MEMS DIRECT CHIP ATTACH PACKAGING METHODOLOGIES AND APPARATUSES FOR HARSH ENVIRONMENTS discloses methods of bulk manufacturing high temperature sensor sub-assembly packages.

I am a named inventor of U.S. Pat. No. 5,637,905 to Carr et al. and it discloses a high temperature pressure and displacement microsensor made from a Si substrate. A first coil structure is positioned within a recess in the Si substrate. A pressure diaphragm is glass bonded about its periphery to the rim of the recess in the semiconductor substrate. A second coil structure is positioned on the underside of the pressure diaphragm and is electrically isolated from the first coil structure. The coils are inductively coupled together and provide an output indicative of changes in the coupling between the coils.

My U.S. Pat. No. 6,248,646 discloses a process for making an array of SiC wafers on standard larger industry sized wafers. This patent discusses the operating conditions for SiC and SiC-On-Insulator technology and cites the need for sensors and other devices made from SiC.

U.S. Pat. No. 6,883,774 B2 to Nielsen et al. entitled Microelectromechanical High Pressure Microvalve discloses first and second layers of SiC or Si, a stainless steel diaphragm member and switching means. The microvalve is designed for high pressure applications and employs a thin metallic diaphragm sandwiched between first and second layers of SiC or Si. The cracking pressure at which the stainless steel diaphragm opens is approximately 800 psi and the microvalve may be modified to open at pressures from 800-1200 psi. The diaphragm is biased in the closed position and moves from the closed position to the open position when the pressure of fluid in the inlet reaches a preset value. The switching means is connected to the valve body for moving the diaphragm to the closed position against pressure of the fluid in the inlet to the valve. "A recess or cavity 50 in the valve body 26 is provided to allow the diaphragm 16, specifically the central portion thereof, to flex upward, away from valve seat 30a. With the preferred embodiment of microvalve 10, a sloped "dome" is ablated in the underside of the top SiC or Si wafer in order to provide a gentle valve stop. This extends valve life by reducing stress concentrations on the valve diaphragm 16. The smooth sloped edges of the recess provide a gentle stop and prevent rupturing the thin diaphragm of the valve." See, col. 3, lines 54 et seq. of the '774 patent. A laser is used to form the contours of the underside of the top SiC or Si wafer by ablating the SiC or Si. A shape memory alloy actuator, a piezoelectric actuator, a microsolenoid actuator, or an electromagnetic actuator may be used. The disclosure of the '774 patent indicates and recites "switching means" and movement of the diaphragm from the closed position to the open position. The '774 patent describes a relief valve.

U.S. Pat. No. 6,774,337 B2 to Claydon et al. entitled Method For Protecting The Diaphragm And Extending The Life Of SiC And/Or Si MEMS Microvalves discloses a microvalve and method of forming a diaphragm stop for a microvalve. Much of the disclosure of the '337 patent is similar to the disclosure of the '774 patent but the claimed subject matter differs. United States Patent Application Publication No. US 2005/0098749 A1 is a divisional of the '337 patent and discloses in the proposed claims that the second layer defines a contoured, sloped recess above a central portion of the diaphragm to receive the diaphragm when the diaphragm moves from the closed position to the open position.

U.S. Pat. No. 6,557,820 B2 to Wetzel discloses a prestressed diaphragm sandwiched between the upper and lower main bodies in a two-stage valve. The valving arrangement is used to control pressure supplied to the top side of the diaphragm which in turn actuates the principal valve.

U.S. Pat. No. 6,592,098 B2 to Kao discloses a microvalve employing a diaphragm controlled by an electrostatic external actuator device. Both the valve seat and the valve can be comprised of Si.

U.S. Pat. No. 6,126,140 to Johnson et al. discloses electrically conductive polysilicon diaphragms which are corrugated on the periphery thereof. See, col. 2, lines 19-22 of the '140 patent. A three wire system is employed to move the diaphragm toward the open or closed direction.

U.S. Pat. No. 5,452,878 to Gravesen et al. entitled Miniature Actuating Device discloses a diaphragm etched in a substrate, a carrier, and an insulator between the carrier and the diaphragm. An electrostatic field is produced between the carrier and the diaphragm to open and close the device.

U.S. Pat. No. 5,209,118 to Jerman entitled Semiconductor Transducer Or Actuator Utilizing Corrugated Supports discloses a semiconductor deflecting member having vertical travel which is a linear function of applied force. Capacitive plates are used to measure the movement of the deflecting member.

There is growing demand for improved efficient management of energy consumption in jet engines and automobiles. Global reduction of undesirable emissions of hydrocarbons and other combustion by-products such as oxides of nitrogen and carbon monoxide is being sought assiduously. Semiconductor based devices and electronics targeted for insertion in high temperature, extreme vibration, and corrosive media must satisfy a set of minimum reliability criteria before becoming acceptable for operational use.

Typically these devices operate in environments of 600° C. and above. This is very challenging since conventional semiconductor electronic and sensing devices are limited to operating in temperatures less than 300° C. due to the limitations imposed by material properties and packaging. Silicon carbide-based electronics and sensors have been demonstrated to operate in temperatures up to 1000° C. thereby offering promise of direct insertion into the high temperature environment.

SUMMARY OF THE INVENTION

An actuator operated microvalve and the method of making same is disclosed and claimed. The microvalve comprises a SiC housing which includes a first lower portion and a second upper portion. The lower portion of the SiC housing includes a passageway therethrough, a microvalve seat, and a moveable SiC diaphragm. The SiC diaphragm includes a centrally located boss and radially extending corrugations which may be sinusoidally shaped. The boss of the SiC diaphragm moves and modulates in a range of positions between a closed position wherein the boss interengages said microvalve seat prohibiting communication of fluid through the passageway and a fully open position when the boss is spaced apart from the seat at its maximum permitting communication of fluid through said passageway. The actuator includes a SiC top plate with an extended boss affixed to the diaphragm. A first electrode sits on top of the SiC top plate. The second upper portion of the SiC housing further includes a second electrode.

Each finished actuator operated microvalve is approximately 30 mm in diameter. Other sizes may be employed. The first lower portion of the housing and the second upper portion of the housing are generally circular or disk shaped. The diaphragm is generally circular or disk shaped. The SiC top plate is generally circular or disk shaped with a centrally located cylindrical protrusion which is affixed to the diaphragm.

All components of the actuator operated microvalve are batch fabricated in an array. An array of diaphragms is grown on a mold that is about the size of a CD (compact disk). For instance, 16 diaphragms may be manufactured using a mold which is about the size of a CD (compact disk). Alternatively, the diaphragms may be grown on molds which are 16 inches in diameter or larger. The first lower portion and second upper portion of the SiC housing components are also batch fabricated on a wafer about the size of a CD (compact disk). Alternatively, the first lower portions and the second upper portions of the SiC housing components may be batch fabricated with a wafer which is 16 inches in diameter or larger.

The top plate includes a first electrode upon which a first voltage is impressed. The second upper portion of the SiC housing further includes a second electrode which is typically grounded. The first electrode and hence the top plate are attracted toward the second electrode and hence the second upper portion of the housing when the first voltage is different than the second voltage urging the boss of the diaphragm toward the valve seat and the closed position.

The first electrode is preferably a nickel plate affixed to the top plate and the second electrode is preferably a nickel plate. The first electrode is the anode and the second electrode is the cathode. Alternatively the SiC top plate is heavily doped to be conductive and the doped top plate constitutes the first electrode. The SiC top plate includes a cylindrical portion and an insulator is affixed to the boss of the diaphragm and the cylindrical portion of the top plate to provide electrical isolation.

The second upper housing portion includes a second electrode which is the cathode. Typically, the second electrode is held at ground potential although other voltages may be impressed on the cathode. The second upper portion of the housing is preferably made of SiC and can be doped to be conductive.

The underside of the top SiC plate may also be corrugated and the top of the second upper portion of the SiC housing may also be corrugated. These corrugations are arranged such that the minima and maxima of the top plate coincide, respectively, with the minima and maxima of the second upper housing creating a large surface area between the plates. This has the advantage of allowing larger attractive to be generated by less voltage difference. This force can be approximated by the electrostatic force equation.

Nickel plating the corrugations surfaces has the benefit of adding stiffness to the SiC top plate and the second upper portion of the SiC housing.

The attraction of the SiC top plate and the second upper portion of the SiC housing is dependent on the magnitude of the voltage difference between the plates.

The corrugations of the diaphragm are preferably sinusoidally shaped and extend radially outwardly from the cylindrical central boss. Corrugations change the nature of the diaphragm plate to one of primarily bending. This means that deflection becomes much more linearly proportional to an applied force over a much larger deflection range than for that of a non-corrugated plate. The important feature of corrugations is that they reduce the cubic constant in proportion to the linear constant giving a more linearized force-deflection response. The SiC diaphragm comprises a cylindrical central boss portion, radially extending corrugations which extend periodically in a circumferential fashion, and a radially extending planar portion. Other shapes such as square-wave shapes may be used depending on the desired operating characteristics of the actuator operated microvalve. Generally the corrugations may be manufactured in any polygonal shape. Corrugations having sinusoidal shapes are useful in that they permit a large range of motion or stroke for the diaphragm which in turn results in high flow characteristics. The corrugated diaphragms of the instant invention can modulate at 5 kHz. The upper portion of the SiC housing includes a cylindrical central recess therein which allows the diaphragm to flex upwardly without interference.

The actuator operated microvalve of the present invention may be used in combination with a closed loop combustion control system wherein the voltage between the plates is modulated using a square or sinusoidal wave voltage. Alternatively, the first voltage with respect to the second voltage is continuously modulated by an analog signal. The combustion control system includes an algorithm and may be, for example, a proportional plus integral plus derivative algorithm. This algorithm can be implemented through a digital (square wave output) or analog (continuous) output to the first and second electrostatic plates.

An array of addressable actuator operated microvalves may be used in controlling a combustion control process in combination with a process controller. The actuator operated microvalve of the instant invention provides for distributed fuel injection into a combustion process at low pressures using low voltages across the electrostatic plates. The process controller includes inputs from an array of sensors (such as pressure and temperature sensors) which feedback processed signals for comparison to desired setpoints. The setpoints themselves may be fixed or they may be variable depending on the sophistication of the controller. The combustion control system may include an array of addressable actuator operated microvalves to distribute fuel into a flow stream along a combustion passageway in a jet engine. One application of the invention is use in turbine combustors in which ultra low $NO_x$ emissions are achieved by burning a uniform, lean fuel-air mixture (low flame temperatures) and creating small burning zones (low residence times) due to a plurality of actuator operated microvalves arranged in arrays. These arrays can be thought of as a shower head fuel distribution system.

Prior art devices utilize actuators having high voltages and/or currents which tend to arc when placed in a fuel flow field. This leads to premature ignition and dangerous explosions within the flow channel. Piezoelectric actuators suffer from small displacements and are unstable at high temperatures. The production of the prior art actuators is performed on a component by component basis resulting in non-uniformity of the actuators.

Alternatively, the combustion may occur in a cylinder of an internal combustion engine. Performance of each cylinder can be evaluated and more or less fuel may be added to a particular cylinder or more or less fuel may be added to a particular region of a cylinder. This will result in increased fuel efficiency and less carbon monoxide and less oxides of nitrogen in the exhaust.

A method of making a SiC mold useful for making a SiC diaphragm is also disclosed and claimed. The steps include: applying a mask to a SiC wafer; dry etching with Sulfur Hexaflouride or Ammonium Flouride for a period of time; dissolving the mask with Hydrochloric Acid and Nitric Acid solution; repeating the previous steps as necessary to form the desired wave shape; coating the mold with a releasable material; growing or depositing the corrugation on the releasable layer of the mold; dissolving the releasable material; and, separating the mold having the desired wave shape from the diaphragm.

A method for making the actuator operated microvalve is also disclosed and claimed. The method comprises the steps of: forming first and second portions of a SiC housing masks, photoresist, UV light, developer and dry etching; electroplating or sputtering nickel or other metal onto the second portion of the SiC housing forming a first electrode; forming a SiC top plate and a cylinder using masks, photoresist, UV light, developer and dry etching; electroplating or sputtering nickel or other metal onto the SiC top plate forming a second electrode; forming a SiC diaphragm having a boss; attaching the SiC diaphragm to the first lower SiC housing portion; attaching an insulator to the SiC diaphragm; attaching the second portion of the SiC housing to the insulator; attaching the cylinder of the top plate to the boss of the diaphragm; attaching an insulator to the boss of the diaphragm; and, attaching the cylinder of the top plate to the insulator attached to the boss of the diaphragm.

The actuator operated microvalves can be mass produced using MEMS batch fabrication technology and, as such, the per unit cost of the actuator will be reduced. MEMS batch fabrication technology will also result in uniformity and reliability of the actuator operated microvalves.

Because of the excellent high temperature properties of the materials used for production the actuator operated microvalves can operate in environments where the temperature is in the range of 600 to 1000° C. The preferred material used in the actuator operated microvalve is SiC (Silicon Carbide). Metals such as Nickel or Titanium may be used to form the electrostatic plates.

Fuel pressure pushes the SiC corrugated diaphragm and the boss up which, in turn, pushes the cylinder of the SiC top plate and the anode plate up as well. This action opens the valve seat which then allows fuel to flow past the valve seat and through the passage in the first lower portion of the SiC housing. Thus, the microvalve is normally closed and is opened by the fuel pressure. To close the valve, a voltage is applied to the positive electrostatic plate while the second plate is at ground potential. The ensuing electrostatic force, when as high as the corresponding fuel force, will lead to a net zero force on the diaphragm. When the electrostatic force is higher than the corresponding fuel force, the seat is completely sealed and no flow occurs. Modulation of the fuel flow can be achieved by pulsing the applied voltage across the plates.

Alternatively, the second plate on the second upper portion of the SiC housing may be at a potential other than ground. Electrostatic forces due to the electric field between electrical charges can generate relatively large forces given the small electrode separations.

An actuator operated microvalve comprises a body having an aperture therein and a slide having an aperture therein. The microvalve comprises the slide having an aperture therein in combination with an aperture in the body. The slide is moveable in a range of positions between a first open position of the microvalve wherein the aperture of the slide is aligned with the aperture of the body and a second closed position of the microvalve wherein the aperture of the slide is not aligned with the aperture of the body. The lever arm includes a pulling portion and a pushing portion. The lever arm pivots about a fulcrum. An actuator urges the pulling portion outwardly and the pushing portion pivots about the fulcrum into engagement with the slide urging the slide toward the closed position and urging the aperture of the slide out of alignment with the aperture of the body. A bias mechanism resists movement of the slide from the first open position of the microvalve toward the second closed position of the microvalve.

The actuator operated microvalve is developed for insertion or embedding, partially or wholly, in the flow field of a flow channel for the purpose of controlling and modulating the flow of liquid or gas. The actuator operated microvalve provides minimum intrusion in the flow field while at the same time significantly effects the profile of the flow. The actuator operated microvalve provides reasonable valve travel that permits the control and manipulation of flow rates over a wide range. Actuation can be implemented by applying electrostatic, electromagnetic, piezoelectric or electrokinetic principles, although the preferred actuation is electrostatic. To prevent premature fuel ignition and dangerous explosions, the actuation mechanism provides electrical isolation between the fuel path and the actuating electrodes.

The microactuator principally slides laterally back and forth and the process closes and opens a through hole to prevent or permit the flow of gases or liquids. Because it slides laterally its movement is perpendicular to the flow path. As a result, geometrical optimization of the slide will permit only a minimal flow force to act on the slide. The result is that only a relatively small force will be required to move the slider laterally. Because it operates based on the lever-fulcrum system a small actuation displacement results in an amplified lateral displacement. Because of the excellent thermomechanical properties utilized, this sliding microactuator is predicted to operate at temperatures up to 600 degrees C. Most existing actuators cannot support high flow rates because they are limited by the force and displacement required to support such high flows.

The principle of operation of the sliding valve is based on the lever-fulcrum system with the flexibility to be actuated by electrostatic, piezoelectric or electromagnetic devices. The forcing arm is situated in the flow chamber and is in intimate contact with, but not attached to, the slider. The slider is a free floating flat rectangular piece of Nickel. The spring or bias mechanism is another arm similar to but thinner than the pushing arm and located opposite the pushing arm. The pushing arm extends upward and forms part of the spring system and protrudes out to form the pulling portion of the lever. The joining point between the pulling arm is the structure that is separated from the forcing arm by an air gap. This rigid structure acts as the positive plate of the actuator. The vertical face of the forcing arm is electrically grounded. The actuating arm, the pushing arm, the slider, and the return spring are all made of Nickel. Other components are made form a high performance temperature material such as silicon carbide.

When no voltage is applied, the inlet hole, the slider hole and the ejection hole are aligned. This allows unimpeded flow and is considered a normally open state. Except for the positively charged electrostatic plate, the other parts are grounded. When this occurs an electrostatic force is applied between the plates. Because only the forcing arm is free to move, the attraction force pulls it to the left toward the rigid positive plate. This results in the swinging of the amplifying push arm to the right, thereby pushing the slider laterally to close the through hole and prevent flow. The degree of closure is determined by the applied force on the forcing arm. When the force is removed, the spring connected to the slider restores the slider to its original position.

The objective of this approach is to create a force amplification that will allow a large lateral displacement of the slider when pushed by the push-arm of the lever system. Alternative embodiments may include the attachment of a piezoelectric driver directly on to the top actuating arm, such that by exciting the piezoelectric material, the pulling arm is moved sideways back and forth. The characteristically small displacement of the piezoelectric material is amplified by the long pushing arm of the actuator. Another embodiment involves the use of an electromagnetic actuator that is current intensive. Generally, any driver can be attached to the pulling arm to obtain the desired effect of amplification.

It is an object of the present invention to provide actuator operated microvalves in arrays for admission and control of fuel into combustion streams.

It is a further object of the present invention to provide modulating actuator operated microvalves having components manufactured from SiC or Si which are electrostatically operated at low voltages.

It is a further object of the present invention to provide modulating actuator operated microvalves with electrically isolated actuators.

It is a further object of the present invention to provide modulating actuator operated microvalves which are capable of operating at temperatures up to 1000° C.

A better understanding of these and other objects of the invention will be had when reference is made to the Brief Description Of The Drawings and the Claims which follow hereinbelow.

BRIEF DESCRIPTION OF THE DRAWINGS

FIG. 2 is a schematic representation of the invention illustrating the first lower portion and the second upper portion of the SiC housing along with the SiC diaphragm and SiC top plate.

FIG. 2A is another schematic representation of the invention illustrating a diaphragm having multiple corrugations and nickel plates on both the second upper housing and the top plate.

FIG. 4 is a perspective view of a diaphragm having square-wave shaped corrugations.

FIG. 4A is a perspective view of a diaphragm having square-wave shaped corrugations taken along the lines 4A-4A.

FIG. 5 is a cross-sectional schematic view of a SiC wafer from which the first housing portion is produced illustrating a mask applied to one side thereof FIG. 5A is a cross-sectional schematic view of a SiC wafer as illustrated in FIG. 5 after etching of one side has been completed and with a mask applied to the other side thereof.

FIG. 5B is a cross-sectional schematic view of a SiC wafer as illustrated in FIG. 5A with the other side thereof etched.

FIG. 7F is a cross-sectional schematic similar to FIG. 7E illustrating another layer of nickel applied to the first layer of nickel, the exposed portions of the second upper SiC housing and the island of unimidized photoresist.

FIG. 7G is a cross-sectional schematic similar to FIG. 7F with the unimidized layer of photoresist having been lifted off of the central portion of the second upper SiC housing.

FIG. 7H is a cross-sectional schematic similar to FIG. 7F illustrating an orifice being etched therethrough.

FIG. 9 is a cross-sectional schematic of a SiC diaphragm bonded to the first portion of the SiC housing.

FIG. 9A is a cross-sectional schematic of a SiC diaphragm bonded to an insulator which is in turn secured to the second portion of the SiC housing.

A better understanding of the drawings and invention will be had when reference is made to the Description of the Invention and Claims which follow hereinbelow.

DESCRIPTION OF THE INVENTION

Figure 1:
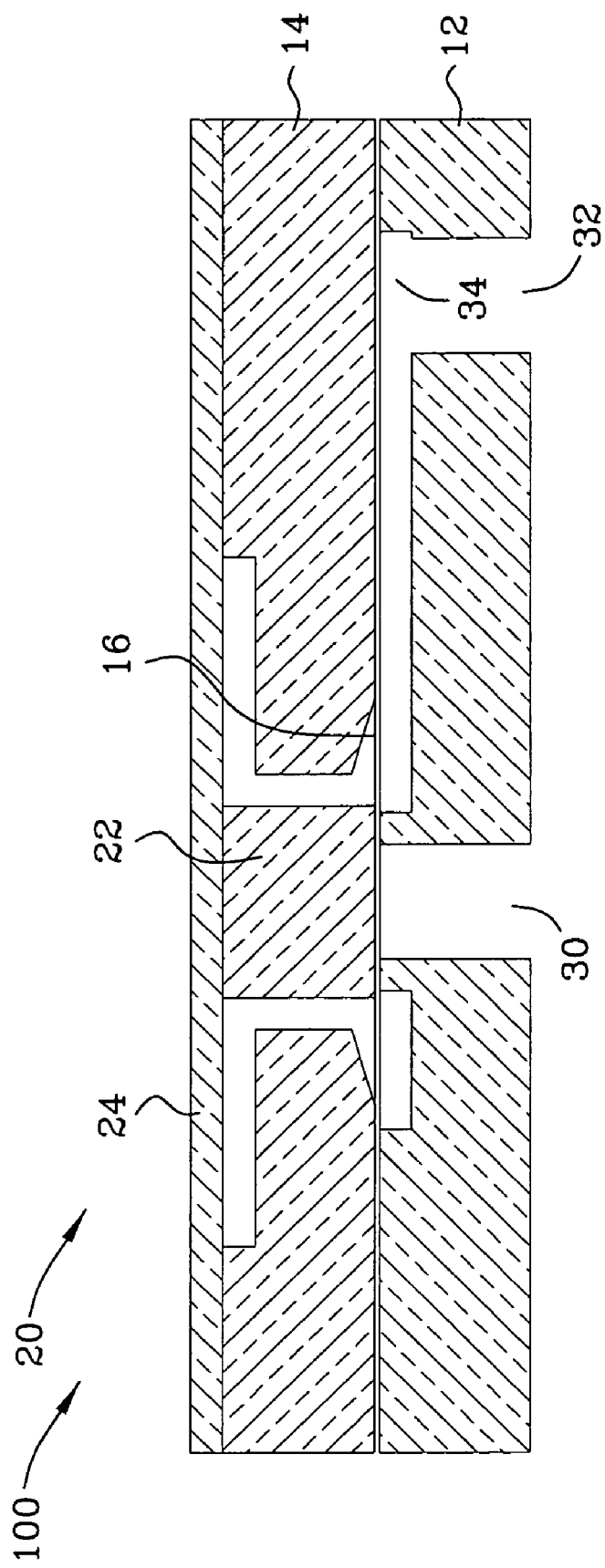
FIG. 1 is a cross-sectional view of a drawing from U.S. Pat. No. 6,774,337.
Figure 3:
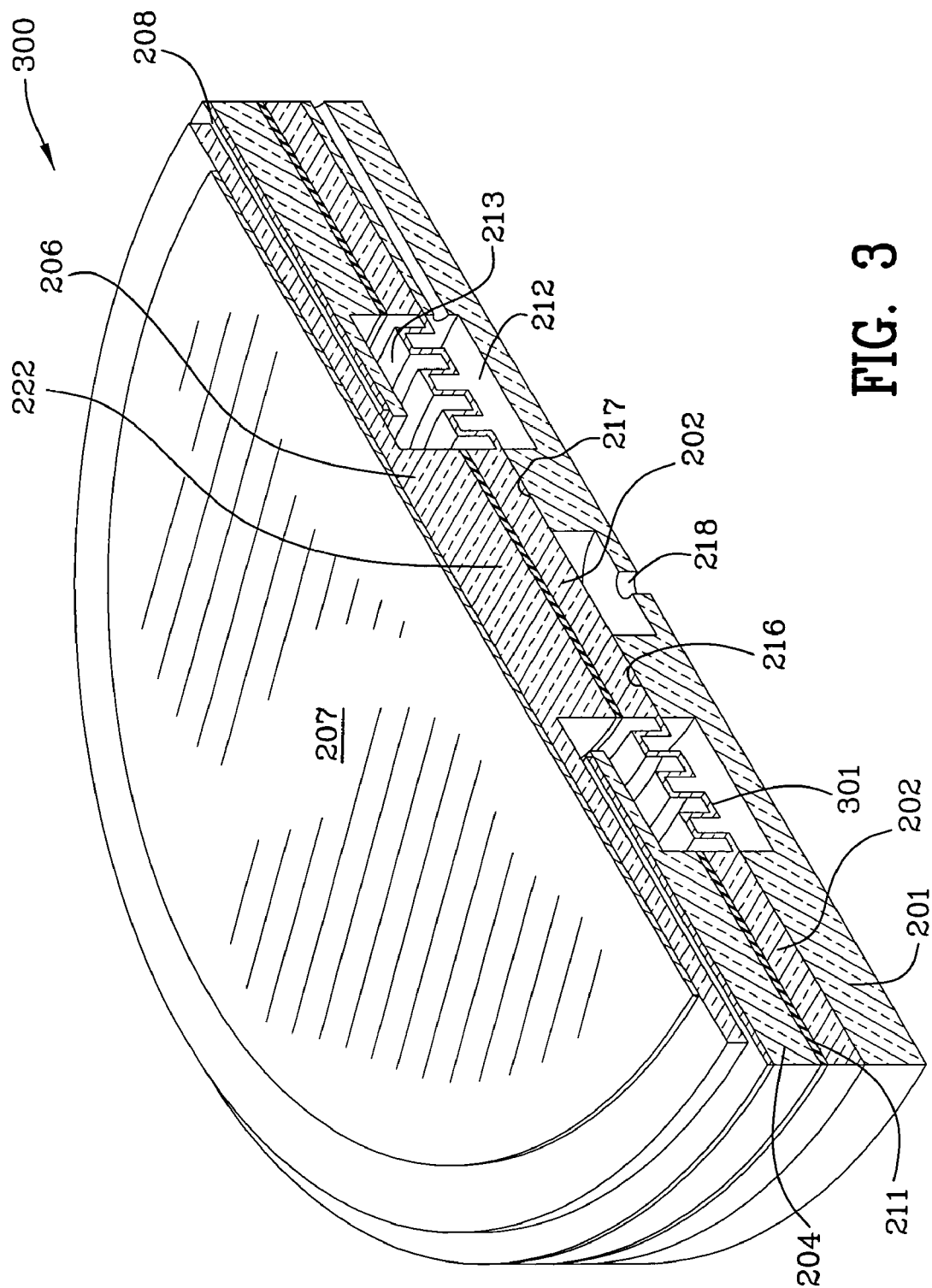
FIG. 3 is a three dimensional representation of the actuator operated microvalve.

FIG. 1 is a cross-sectional view 100 of a drawing FIG. 3 from U.S. Pat. No. 6,774,337. Also, U.S. Pat. No. 6,883,774 B2 illustrates in FIG. 3 thereof the same drawing in a less clear fashion. U.S. Pat. No. 6,883,774 B2 to Nielsen et al. entitled Microelectromechanical High Pressure Microvalve discloses first and second layers (12, 14) of SiC or Si, a stainless steel diaphragm member 16, boss 22 and switching means 20. The microvalve is designed for high pressure applications and employs a thin metallic diaphragm sandwiched between first and second layers of SiC or Si. The cracking pressure at which the stainless steel diaphragm opens is approximately 800 psi and the microvalve may be modified to open at pressures from 800-1200 psi. The diaphragm is biased in the closed position and moves from the closed position to the open position when the pressure of fluid in the inlet reaches a preset value. The switching means is connected to the valve body for moving the diaphragm to the closed position against pressure of the fluid in the inlet to the valve. "A recess or cavity 50 in the valve body 26 is provided to allow the diaphragm 16, specifically the central portion thereof, to flex upward, away from valve seat 30a. With the preferred embodiment of microvalve 10, a sloped "dome" is ablated in the underside of the top SiC or Si wafer in order to provide a gentle valve stop. This extends valve life by reducing stress concentrations on the valve diaphragm 16. The smooth sloped edges of the recess provide a gentle stop and prevent rupturing the thin diaphragm of the valve." See, col. 3, lines 54 et seq. of the '774 patent. A laser is used to form the contours of the underside of the top SiC or Si wafer by ablating the SiC or Si. A shape memory alloy actuator, a piezoelectric actuator, a microsolenoid actuator, or an electromagnetic actuator may be used. The disclosure of the '774 patent indicates and recites switching means 20 and movement of the diaphragm from the closed position to the open position. The '774 patent describes a relief valve.

FIG. 2 is a schematic representation 200 of the actuator operated microvalve illustrating the first lower portion 201 and the second upper portion 204 of the SiC housing along with the SiC diaphragm 202 and SiC top plate 206. The principal portions 201, 202, 204, 206 of the actuator operated microvalve are preferably made of SiC and can be made from other semiconductors such as Si. First lower portion 201 of the SiC housing interengages diaphragm 202 and is at equipotential therewith. The principal portions of the actuator operated microvalve are generally disk-shaped with protrusions and voids therein. FIG. 2 illustrates the diaphragm 202 having radially extending corrugations being a portion of a sine wave 205 and FIG. 2B illustrates radially extending corrugation as including multiple periods of sine waves 205B. Any number of periods of radially extending corrugations may be employed limited, of course, by the size of the MEMS device. Diaphragm 202 includes a flange portion 221 which extends radially from the discontinuation of the radially extending corrugations. A fluid under pressure is employed in the generally annular chamber 212. Chamber 212 is interconnected with a pressure source by a passageway or channel etched into first lower portion 201. Diaphragm 202 includes a central boss 220 which is generally cylindrically shaped. Central boss 220 is illustrated in FIGS. 2, 2A and 2B as engaging valve seat 216, 217. Valve seat 216, 217 is formed from the top of a generally hollow cylinder formed by the etching process. Passageway 218 resides within the generally hollow cylinder and comprises the outlet of the actuator operated microvalve.

SiC diaphragm 202 is bonded to the first lower portion of the SiC housing. An insulator (dielectric) 211 such as a glass bonded oxide is formed between the flange 221 of the diaphragm 202 and the second upper portion 204 of the SiC housing. A braze material such as NiCuSil or TiCuSil is used to secure the glass bonded oxide insulator to the flange 221 of the diaphragm and the second upper portion 204 of the housing. Preferably second upper portion 204 of the SiC housing includes a nickel plate 210 which is deposited thereon. Nickel plate 210 constitutes the negative plate and is at ground potential along with the second upper portion 204 of the SiC housing, the SiC diaphragm 202, and the first lower portion 201 of the SiC housing.

The SiC top plate 206 includes a centrally located protruding cylinder 222. An insulator 209 such as glass bonded oxide is interposed between the boss 220 of the diaphragm and the protruding cylinder 222. Adhesive such as NiCuSil or TiCuSil is used to secure the insulator 209 to both the boss 220 and the cylinder 222. The SiC top plate 206 includes a radially extending flange portion 223. Radially extending flange portion 223 of the SiC top plate is spaced apart from the second upper portion 204 of the SiC housing. Radially extending flange portion 223 of the SiC top plate 206 may include a nickel or other metal plate deposited thereon. A nickel plate 210 or other metal is formed on the top of the second upper portion 204 of the SiC housing. A gap 208 of approximately 2 to 5 microns exists between bottom portion 230 of the SiC top plate 206 and the nickel plate 210 which is deposited on the top of the upper portion 204 of the SiC housing. Other gap spacing may be used depending on the applied voltages and the tolerances applied to the construction of the actuator operated microvalve.

A voltage 214 is applied to nickel plate 207 of the SiC top plate 206 and a voltage 215 that is typically at ground potential is applied to nickel plate 210 on second upper portion 204 of the SiC housing. In the event that a Nickel plate 207 is not employed in connection with the SiC top plate 206 then the entire SiC top plate may be doped to be conductive. Reference numeral 204A represents the opening in the second SiC housing which can serve as a guide for top plate 206 and, in particular, for cylinder portion 222 of the top plate. The gap between cylinder 222 and the opening 204A is approximately 2 microns and may be varied as desired. It will be noted from a careful review of FIGS. 2 and 2A that the nickel plate 210 of the second upper portion of the SiC housing does not extend coterminously with the opening 204A. A void 213 exists above the SiC diaphragm which provides room for the diaphragm to flex upwardly when the microvalve opens and boss 220 lifts off microvalve seat 217/216. Void 213 is formed by etching a circumferential space through the underside of the second upper portion 204 of the SiC housing.

FIG. 2A is another schematic representation 200A of the invention illustrating a diaphragm having multiple corrugations 205A and nickel plates on both the second upper portion 204 of the SiC housing and the SiC top plate 206. In this embodiment multiple square wave corrugations 205A are illustrated.

Figure 2B:
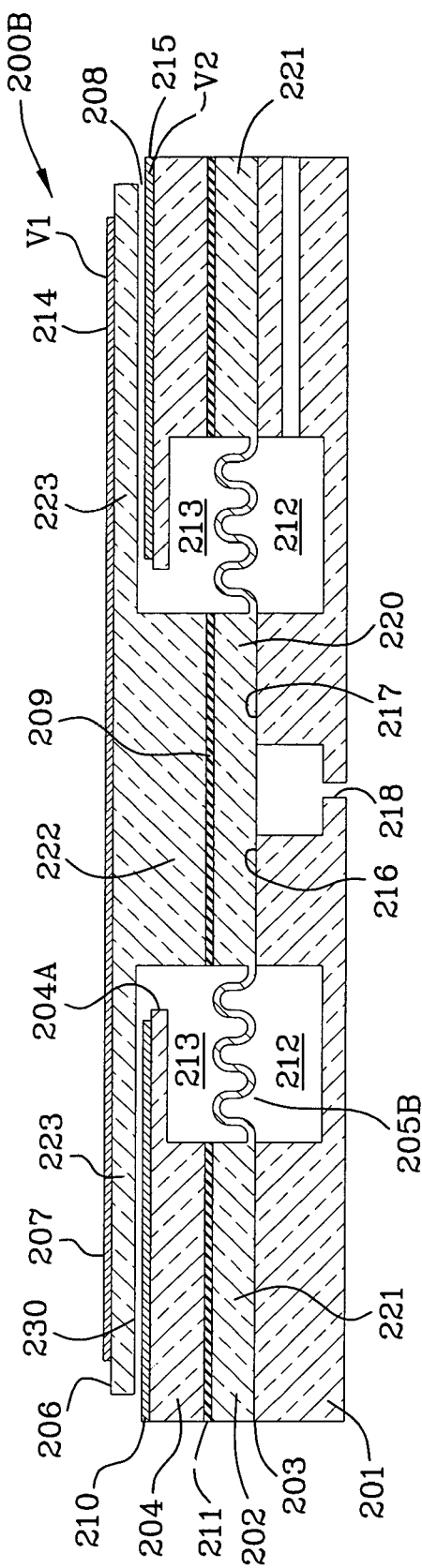
FIG. 2B is another schematic representation of the invention illustrating a diaphragm having multiple corrugations in the form of the preferred sine wave.
Figure 2C:
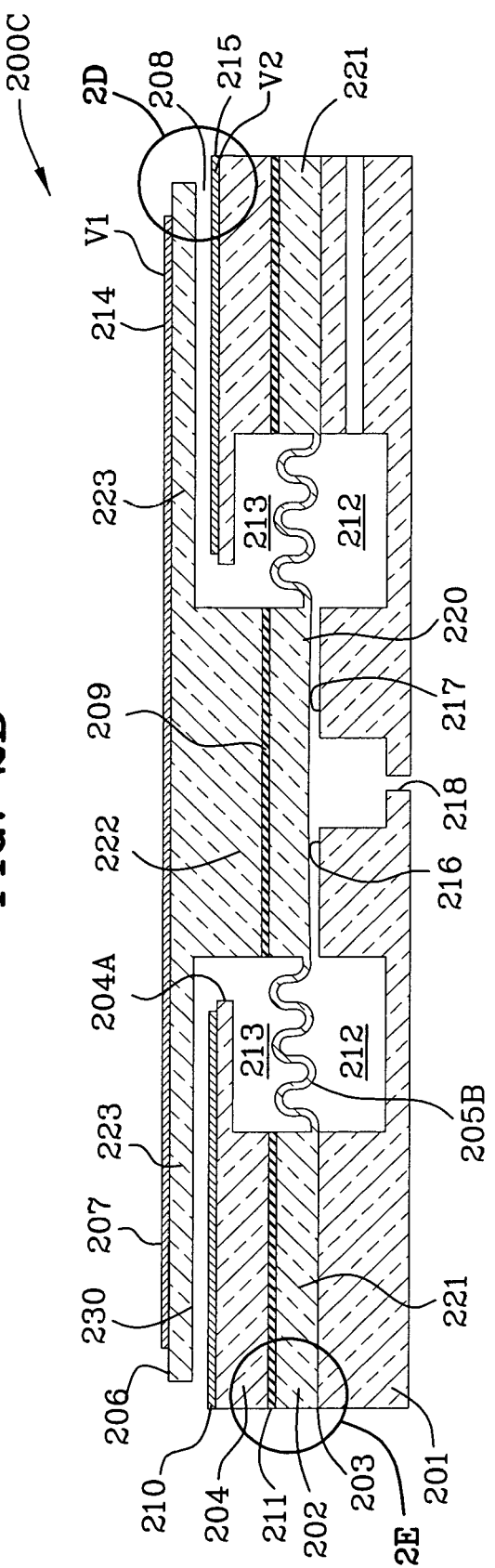
FIG. 2C is a schematic representation illustrating the microvalve off its seat permitting flow between chamber and passageway.

FIG. 2B is another schematic representation 200B of the invention illustrating a diaphragm having multiple corrugations 205B in the form of the preferred sine wave. FIG. 2C is a schematic representation 200C illustrating the microvalve 220 off its seat permitting flow between chamber 212 and passageway 218. Gap 208 is increased by upward movement of top plate 206. Gap 208 is increased by upward movement of top plate 206. Sinusoidally shaped corrugations 205B are preferred as they may flex without the risk of developing a stress fracture. The actuator operated microvalve of the instant invention operates at low pressures of approximately 50 psig or less. Referring to FIG. 2C, the pressure at which the microvalve begins to open is approximately 0.1 psig or less and the maximum pressure in chamber 212 is on the order of 50 psig or less. These electrostatically actuated valves are arranged in arrays and control the flow therethrough depending on the magnitude of the voltage difference between the plates 207, 210. Since a plurality of these electrostatically actuated valves are used to supply fuel to a combustion process they may be operated at low pressure in a shower head fashion.

Figure 2E:
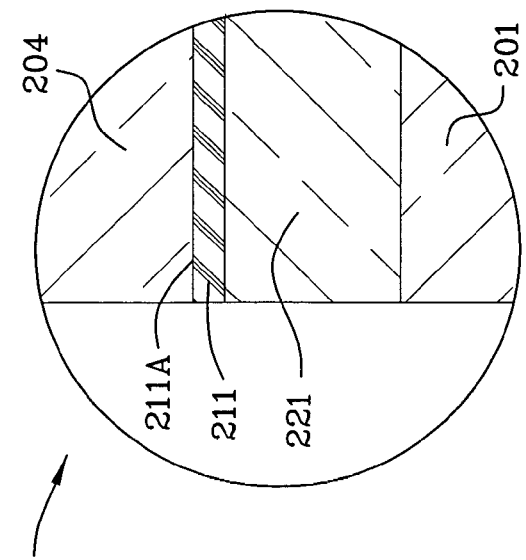
FIG. 2E is an enlargement of a portion of FIG. 2C.
Figure 2D:
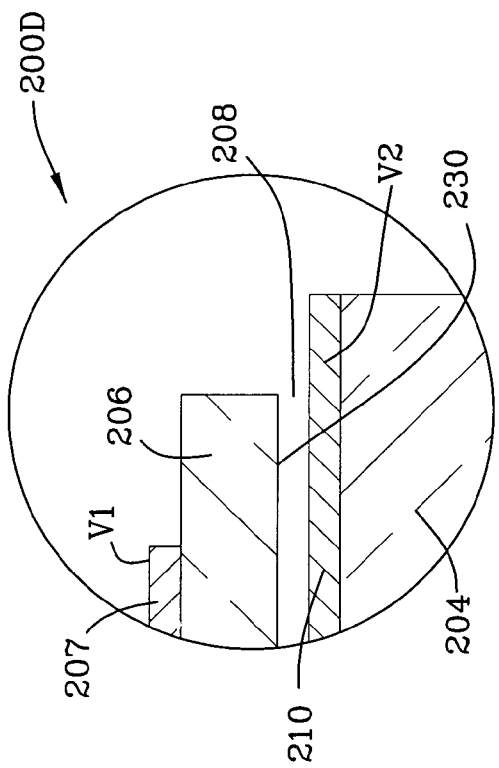
FIG. 2D is an enlargement of a portion of FIG. 2C.

FIG. 2D is an enlargement 200D of a portion of FIG. 2B illustrating the gap 208 between the nickel plate 210 and the nickel plate of SiC top plate 206. $V_1$ is the first voltage 214 and $V_2$ is the second voltage 215 which is typically at ground potential. FIG. 2E is an enlargement of a portion of FIG. 2B and illustrates the insulator 211 secured to the diaphragm 202 and the second upper portion 204 of the SiC housing. Reference numeral 211A represents adhesive applied to the oxide insulator 211 to secure it to both the second upper portion of the housing and to the diaphragm.

Figure 2F:
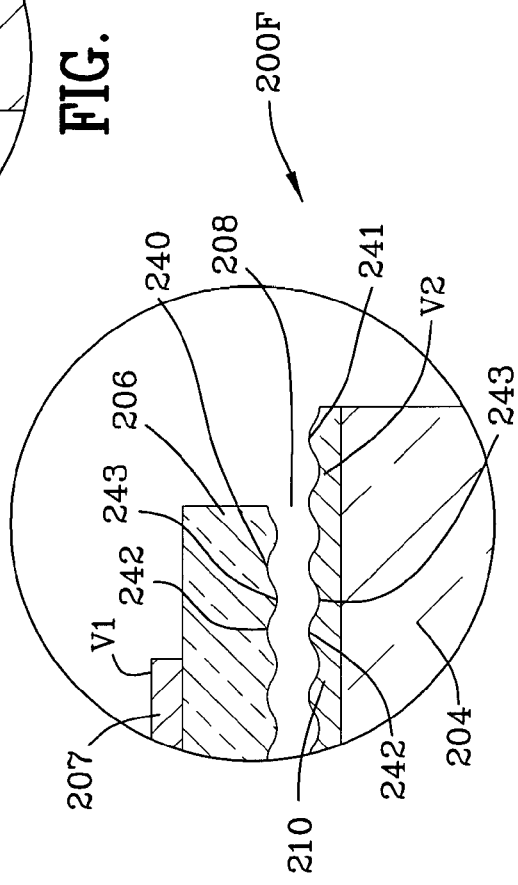
FIG. 2F is another embodiment of the actuator operated microvalve wherein a sinusoidally shaped nickel plate coacts with a sinusoidally shaped nickel plate or a sinusoidally shaped lower surface of the SiC top plate.

FIG. 2F is another embodiment 200F of the actuator operated microvalve wherein sinusoidally shaped nickel plate 241 coacts with a sinusoidally shaped nickel plate or a sinusoidally shaped lower surface 240 of the SiC top plate 206. The maxima 242 and the minima 243 of each sinusoidal wave are aligned rendering a larger surface area between the plate providing more attractive force for the same voltage difference applied across the plates.

Figure 2G:
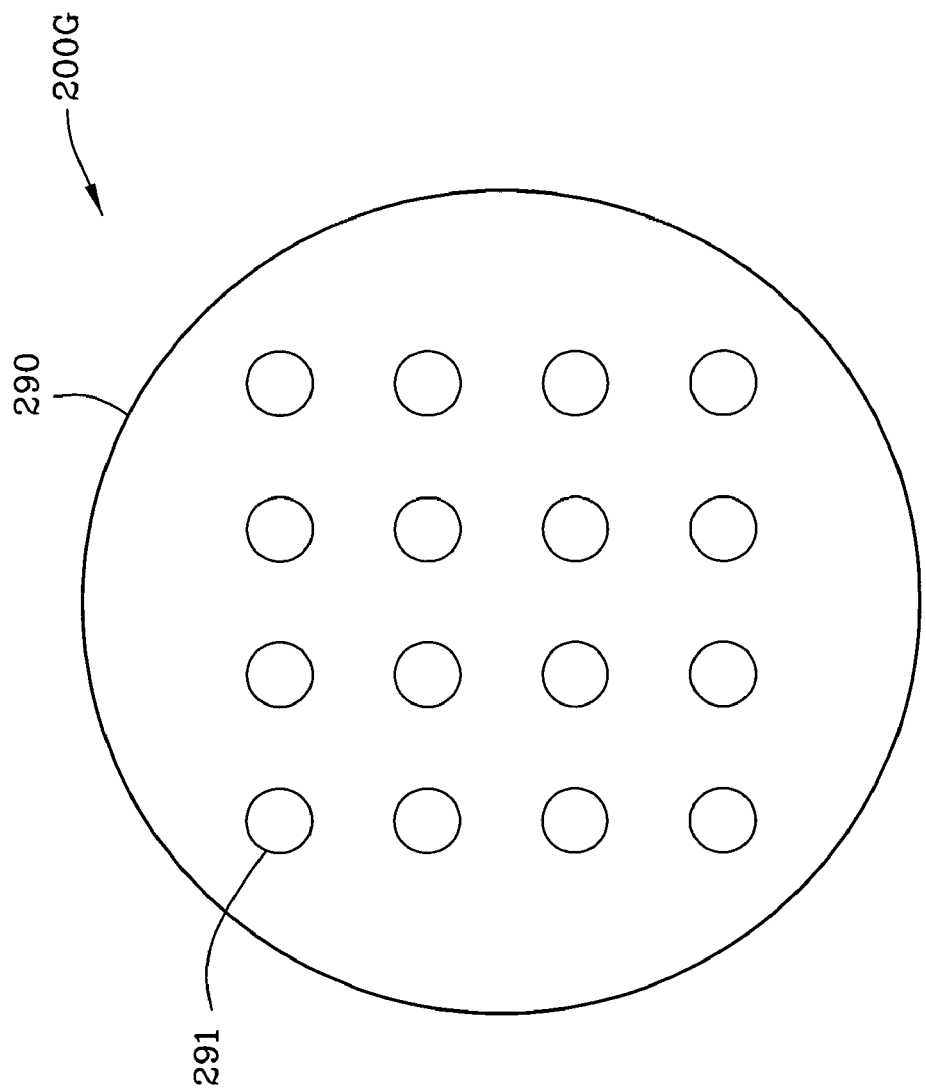
FIG. 2G is a schematic of a wafer or mold illustrating batch fabrication of components of the invention thereon or therein.

FIG. 2G is a schematic 200G of a wafer or mold 290 illustrating batch fabrication of components 291 of the invention thereon or therein. The wafer or mold can be between the size of a CD (compact disk) and a 16 inch diameter wafer. The corrugated diaphragms can be batch fabricated with 16 diaphragms from a single mold as illustrated in FIG. 2G. Alternatively, even more diaphragms can be made from a 16 inch diameter wafer. Similarly, the upper and lower housing portions are batch fabricated from wafers between the size of a CD and a 16 inch diameter wafer. Other wafers having larger diameters are specifically contemplated.

Figure 3A:
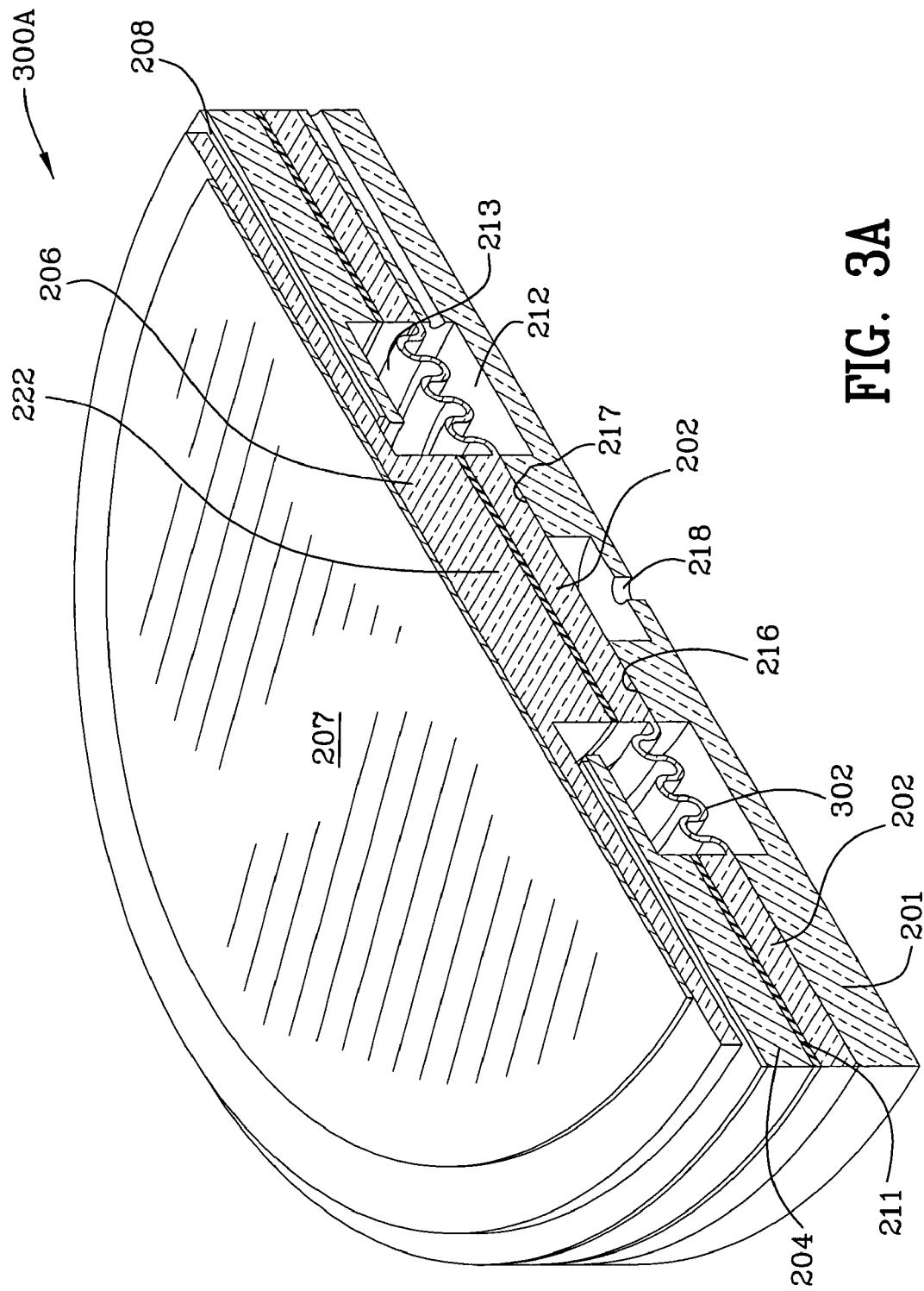
FIG. 3A is a three dimensional representation of the actuator operated microvalve illustrating a sinusoidally shaped corrugated diaphragm.

FIG. 3 is a three dimensional schematic representation 300 of the actuator operated microvalve illustrating square-wave shaped corrugated diaphragm. FIG. 3A is a three dimensional schematic representation 300A of the actuator operated microvalve illustrating a sinusoidally shaped corrugated diaphragm.

Figure 4B:
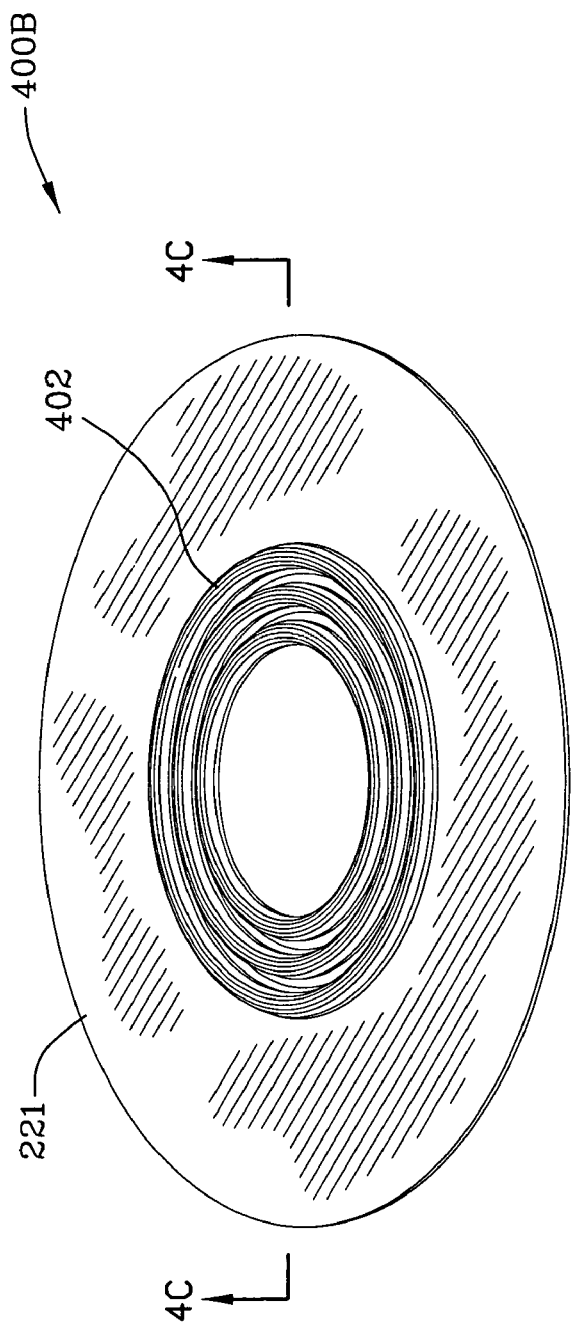
FIG. 4B is a perspective view of a diaphragm having sinusoidally shaped corrugations.
Figure 4C:
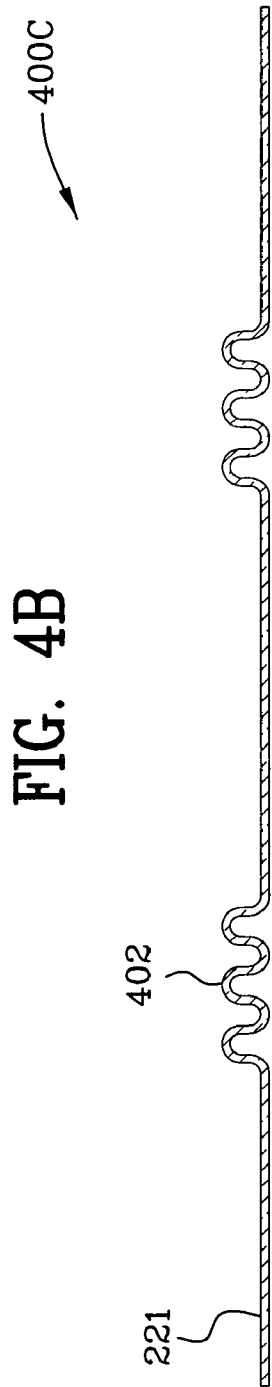
FIG. 4C is a cross-sectional view of the diaphragm of FIG. 4C taken along the lines 4C-4C.

FIG. 4 is a perspective view 400 of a diaphragm having square-wave shaped corrugations 301. FIG. 4A is a cross-sectional view 400A of the diaphragm of FIG. 4 taken along the lines 4A-4A having square-wave shaped corrugations. FIG. 4B is a perspective view 400B of a diaphragm having sinusoidally shaped corrugations 402 and FIG. 4C is a cross-sectional view 400C of the diaphragm of FIG. 4C taken along the lines 4C-4C.

FIG. 5 is a cross-sectional schematic view 500 of a SiC wafer 501 from which the first lower portion of the SiC housing is produced illustrating a mask 502 applied to one side thereof. Nominally the wafer is approximately 750 microns thick. Reference numeral 503 is an aperture in the etch mask which enables dry etching the outlet of the actuator operated microvalve. Wafer 501 in final form is generally disk shaped and has contours thereon. Wafer 501 is manufactured using a batch process wherein it is one of a plurality of micro machine components.

In describing the masking and etching procedure used herein, it will be understood by those skilled in the art that the normal steps of applying photoresist, imidizing the photoresist with a UV light source, removing the imidized photoresist and then dry etching with $SF_6$, $NF_3$, or $CF_4$ are necessary to accomplish the etching as described herein and the forming of like components of the actuator operated microvalve. Sometimes herein the term "mask" is used to generically refer to the preparatory process for etching and the use of term "mask" is not being used literally.

FIG. 5A is a cross-sectional schematic view 500A of the SiC wafer as illustrated in FIG. 5 after etching of one side has been completed and with a mask 504, 505, 506 and 507 applied to the other side thereof. Reference numeral 503A illustrates the outlet of the microvalve which was formed by the dry etching process. Dry etching is performed to generate the contours of the first lower portion of the SiC housing as illustrated in FIG. 5B. FIG. 5B is a cross-sectional schematic view 500B of a SiC wafer as illustrated in FIG. 5A with the other side thereof etched. The valve seat is denoted by reference numerals 520, 521. As described above in connection with FIG. 2, the valve seat is generally formed in the shape of an annulus. Following the etching process with $SF_6$, $NF_3$, $CF_4$, resulting surfaces 510, 511 and 512 are formed and best viewed in FIG. 5B.

Figure 6:
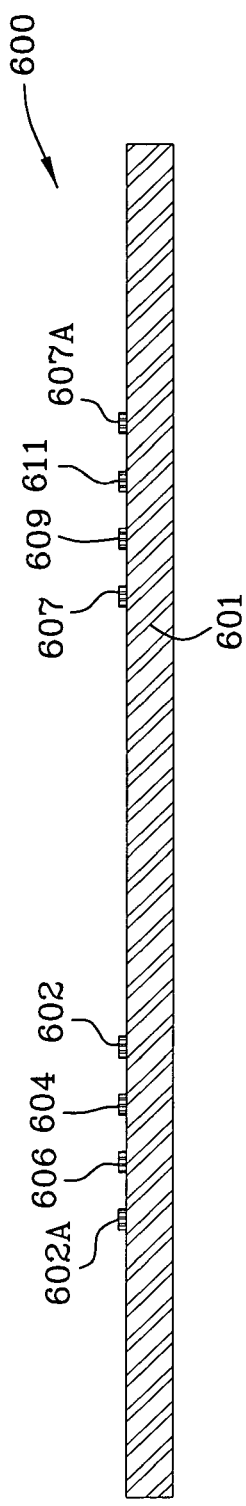
FIG. 6 is a cross-sectional schematic of a wafer from which a mold is manufactured.
Figure 6A:
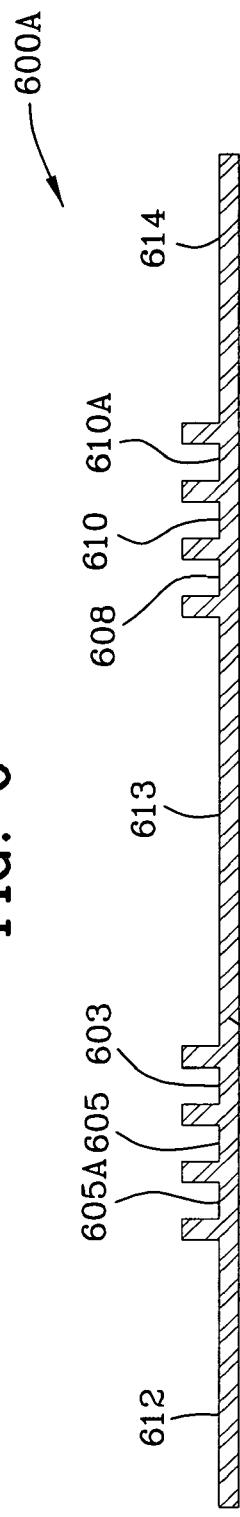
FIG. 6A is a cross-sectional schematic view similar to FIG. 6 after the dry etching has been performed.
Figure 6B:
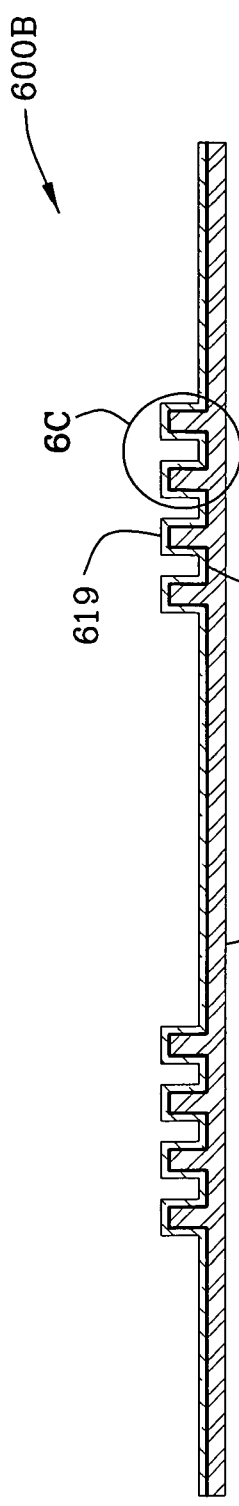
FIG. 6B is a cross-sectional schematic of the mold/carrier with a releasable layer applied thereto.
Figure 6C:
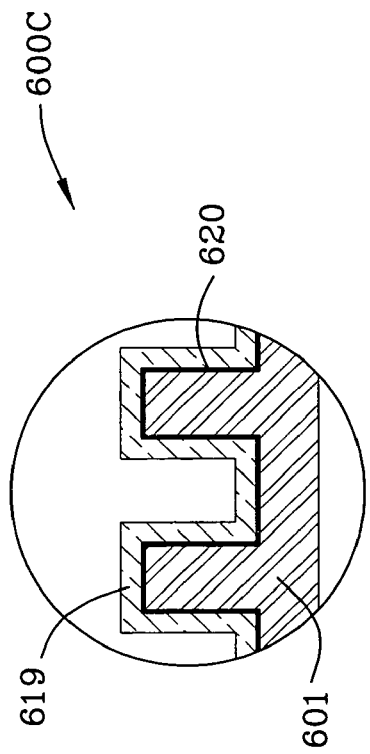
FIG. 6C is an enlargement of a portion of FIG. 6B.

FIG. 6 is a cross-sectional schematic 600 of a wafer 601 from which a mold is manufactured and a mask 602, 602A, 604, 606, 607, 607A, 609, and 611 is applied to a portion thereof. Etched areas are represented by reference numerals 603, 605, 605A, 608, 610, 610A, 612, 613 and 614. FIG. 6A is a cross-sectional schematic view similar to FIG. 6 after the dry etching has been performed. FIG. 6B is a cross-sectional schematic 600A of the mold/carrier with a releasable layer 620 applied thereto with the SiC being deposited thereon by chemical vapor deposition. Sometimes herein the process of applying the SiC by chemical vapor deposition is referred to herein as being grown. FIG. 6C is an enlargement of a portion of FIG. 6B illustrating the releasable layer 620 and the SiC 619 being deposited thereon.

Figure 6D:
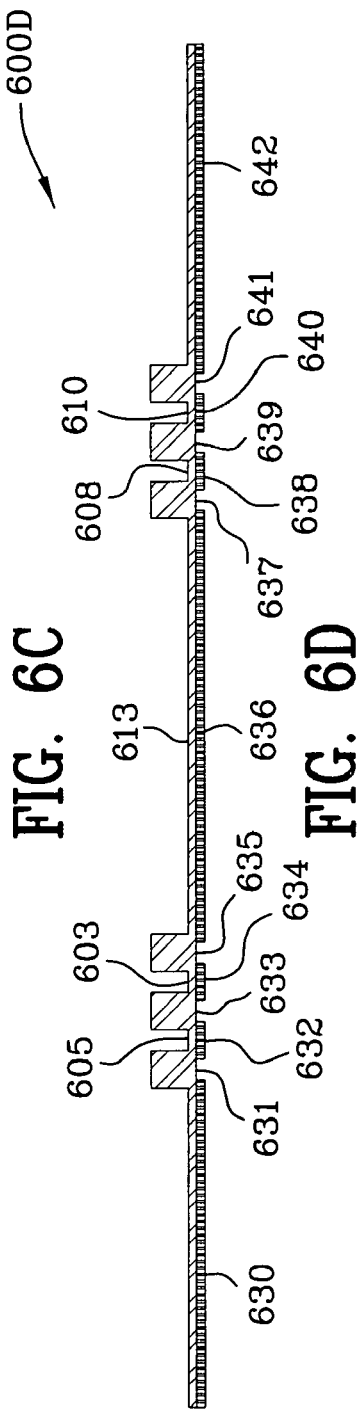
FIG. 6D is a cross-sectional schematic similar to that of FIG. 6A with the mask as shown in FIG. 6A removed and a mask applied to the other side thereof.
Figure 6E:
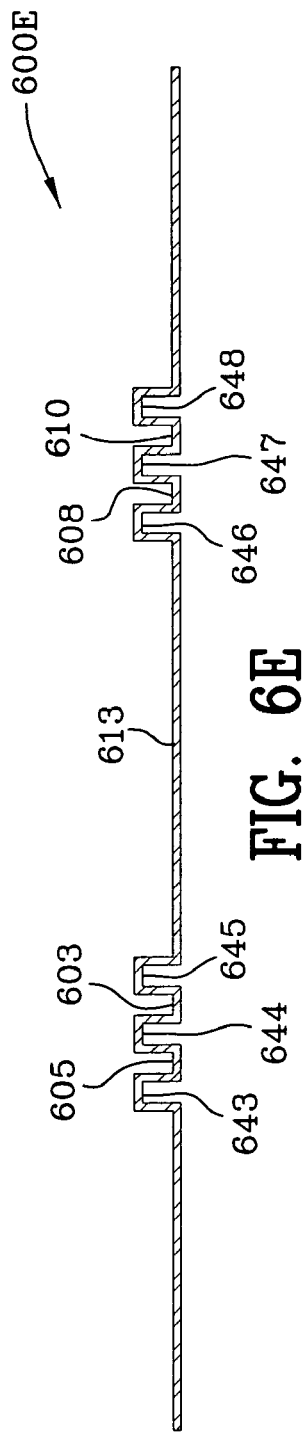
FIG. 6E is a cross-sectional schematic similar to that of FIG. 6D with both sides having been etched illustrating the completed two sided mold.

FIG. 6D is a cross-sectional schematic 600D similar to that of FIG. 6A with the mask as shown in FIG. 6A removed and a mask applied to the other side thereof. Reference numerals 630, 632, 634, 636, 638, 640, 642 indicate mask sections. Apertures are indicated by reference numerals 631, 633, 635, 637, 639 and 641. FIG. 6E is a cross-sectional schematic 600D similar to that of FIG. 6D with both sides having been etched illustrating a completed two sided mold. The two sided mold of FIG. 6E is an alternative embodiment of the mold. Reference numerals 603, 605, 608, 610, 643, 644, 645, 646, 647 and 648 indicate completed reciprocal mold surfaces. A two sided mold is obviously more productive for growing the SiC diaphragms thereon after receiving a releasable layer on both sides thereof. Where a sinusoidal mold is desired, the same can be made from a repetitive process of masking as set forth in FIG. 6C. In forming the contours of the sinusoidally shaped mold it is necessary to repeatedly apply masks so as to protect the already etched sections of the mold.

Figure 6F:
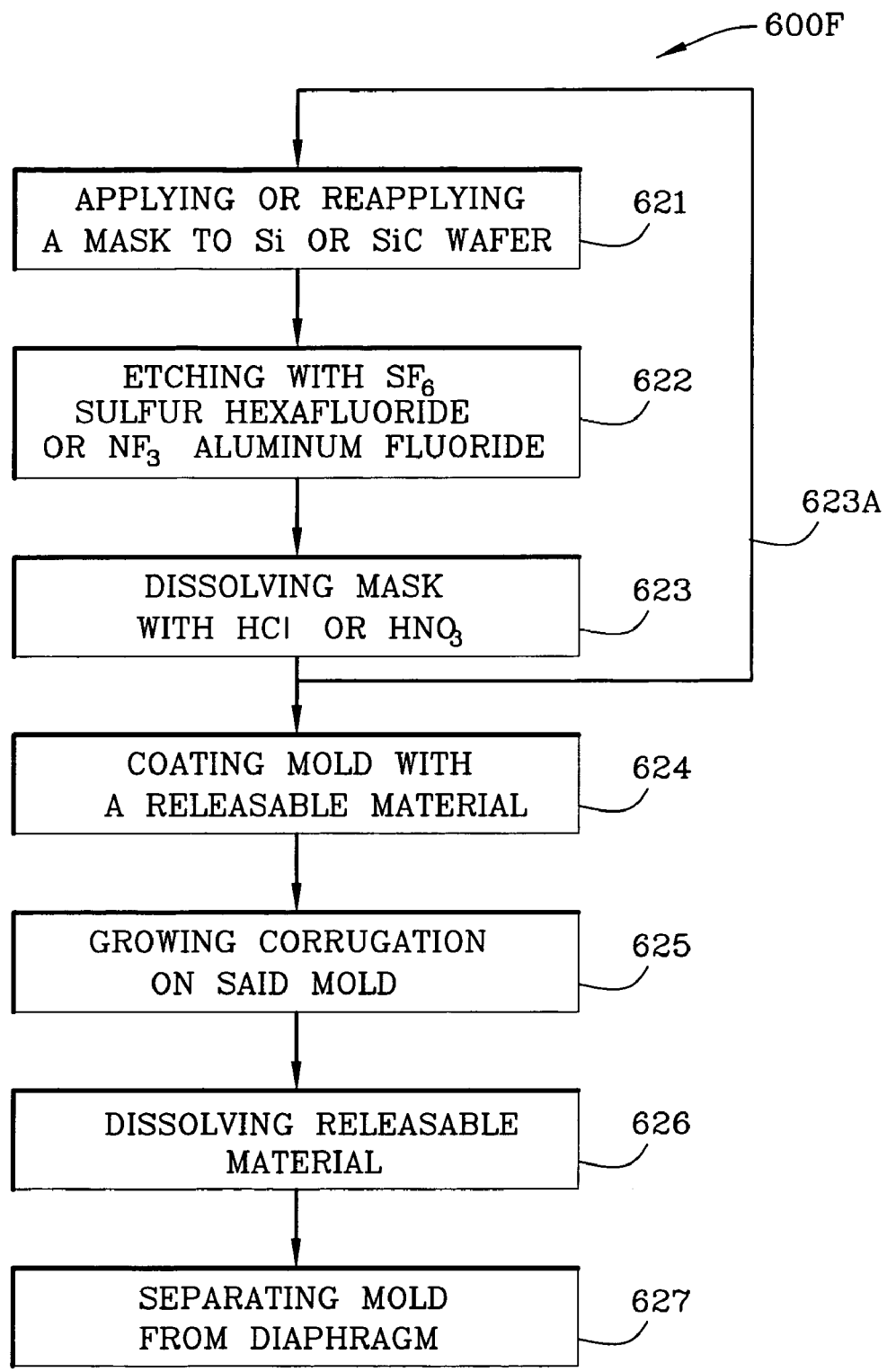
FIG. 6F is a flow chart illustrating the process steps for making the diaphragm.

FIG. 6F is a flow chart/schematic representation 600F illustrating the process steps for manufacturing a mold/diaphragm comprising the steps: of applying or reapplying 621 a mask to a Si or SiC wafer; dry etching 622 with Sulfur Hexaflouride or Ammonium Flouride, dissolving 623 the mask with a Hydrochloric Acid and Nitric Acid solution to complete the formation of the mold; repeating 623A steps 621, 622 and 623 to form a sinusoidally shaped mold; coating 624 the mold with a releasable layer; growing 625 corrugations on the mold; dissolving the releasable material; and, separating the mold from the diaphragm leaving the remaining square-wave, sinusoidal wave or other shape mold.

Figure 7:
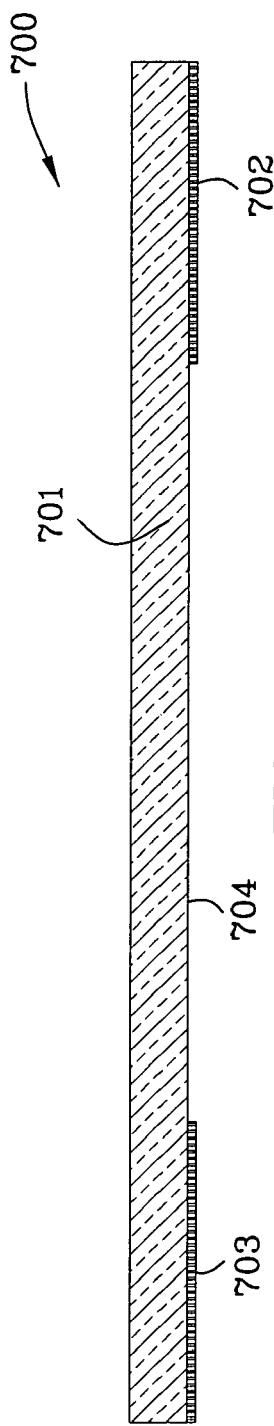
FIG. 7 is a cross-sectional schematic of the second upper SiC housing portion with a mask applied to one side thereof.
Figure 7A:
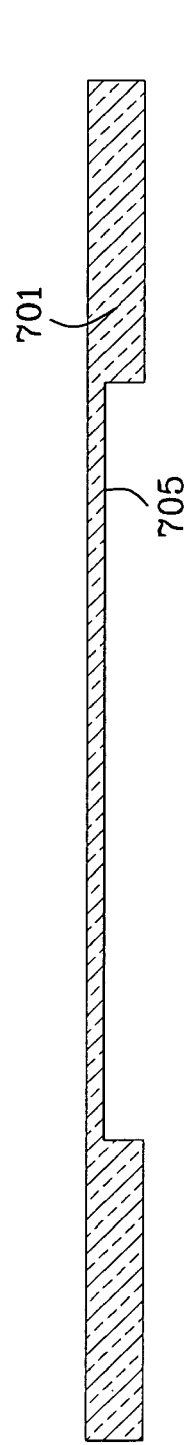
FIG. 7A is cross-sectional schematic of the second upper SiC housing portion with the underside thereof etched
Figure 7B:
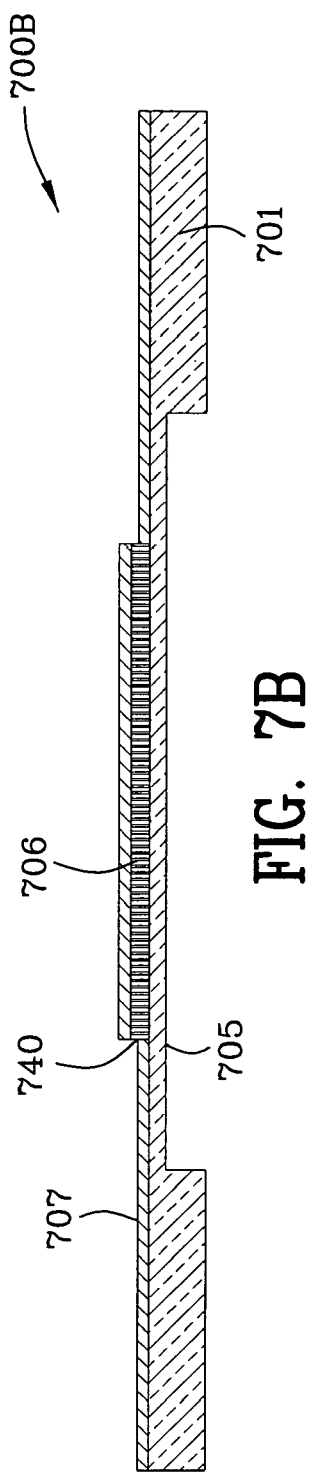
FIG. 7B is a cross-sectional schematic of the second upper SiC housing portion with a portion of the yet unetched side having unimidized photoresist applied thereto and a nickel or titanium plating over the photoresist and the remaining portion of the unetched side.
Figure 7C:
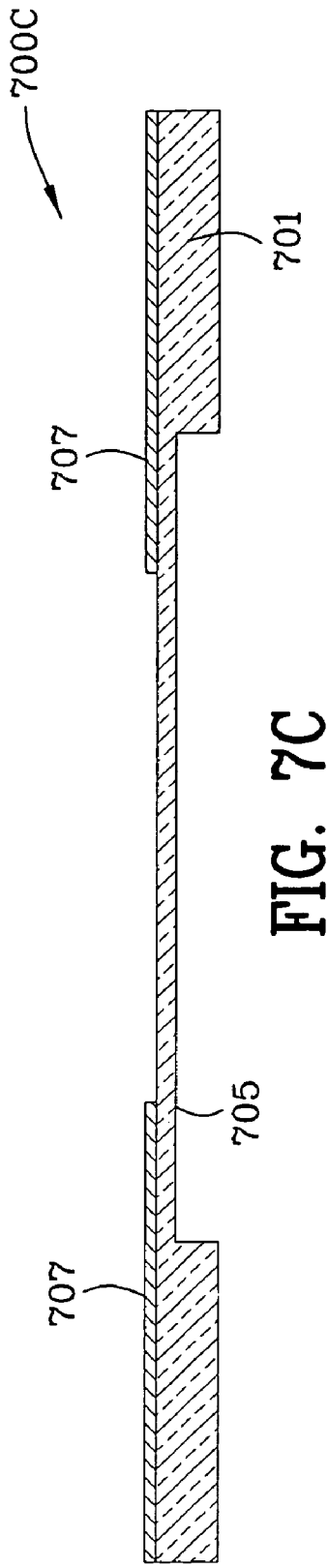
FIG. 7C is a cross-sectional schematic similar to FIG. 7B with the unimidized photoresist and nickel above the unimidized photoresist being lifted off.
Figure 7D:
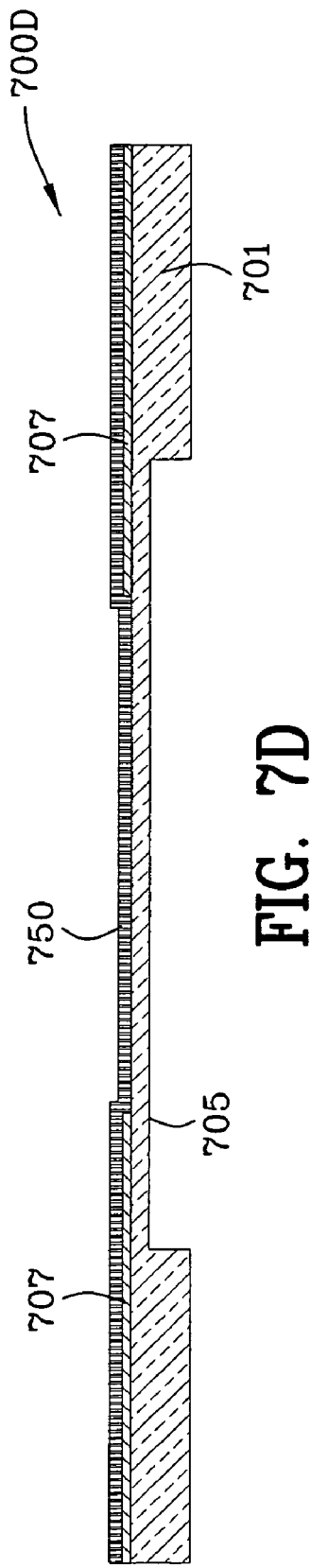
FIG. 7D is a cross-sectional schematic similar to FIG. 7C with another layer of photoresist applied over the nickel and on the exposed portion of the second upper SiC housing.
Figure 7E:
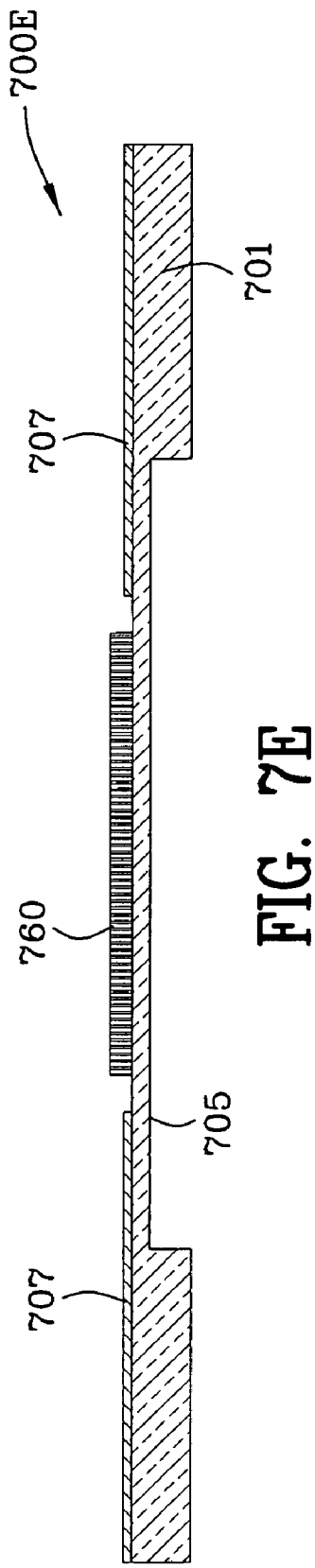
FIG. 7E is a cross-sectional schematic illustrating an island of unimidized photoresist being centrally located on the second upper SiC housing.

FIG. 7 is a cross-sectional schematic 700 of the second upper SiC housing portion with a mask 702, 703 applied to one side thereof. FIG. 7A is cross-sectional schematic 700A of the second upper 701 SiC housing portion with the underside 704 thereof etched. Protected portions 702, 703, sometimes referred to as masked portions, enable the etching of the underside 704. Reference numeral 705 represents the surface following etching. FIG. 7B is a cross-sectional schematic 700B of the second upper SiC housing portion with a portion of the yet unetched side having unimidized photoresist 706 applied thereto and a nickel or titanium plating 707 over the photoresist 706 and the remaining portion of the unetched side. Reference numeral 740 indicates exposed photoresist which provides a pathway for the dissolving agent to attack the photoresist. FIG. 7C is a cross-sectional schematic 700C similar to FIG. 7B with the unimidized photoresist 706 and nickel above the unimidized photoresist being lifted off/dissolved. FIG. 7D is a cross-sectional schematic 700D similar to FIG. 7C with another layer of photoresist 750 applied over the nickel and on the exposed portion of the second upper SiC housing. FIG. 7E is a cross-sectional schematic 700E illustrating an island 760 of unimidized photoresist being centrally located on the second upper SiC housing. The remaining photoresist was removed after masking, exposing and developing. FIG. 7F is a cross-sectional schematic 700F illustrating another layer of nickel 708 applied to the first layer of nickel 707, the exposed portions of the second upper SiC housing and the island 760 of unimidized photoresist. Reference numeral 761 indicates the exposed portion of the unimidized photoresist which may be attacked by the dissolving agent.

FIG. 7G is a cross-sectional schematic 700G similar to FIG. 7F with the unimidized layer of photoresist 760 having been lifted off of the central portion of the second upper SiC housing. Exposed area 708A illustrates the area left for etching. FIG. 7H is a cross-sectional schematic 700H similar to FIG. 7G indicating an orifice 709 being etched therethrough. FIG. 7H also illustrates the orifice acting as a diametrical guide 709 formed in the finished second upper portion.

Figure 8:
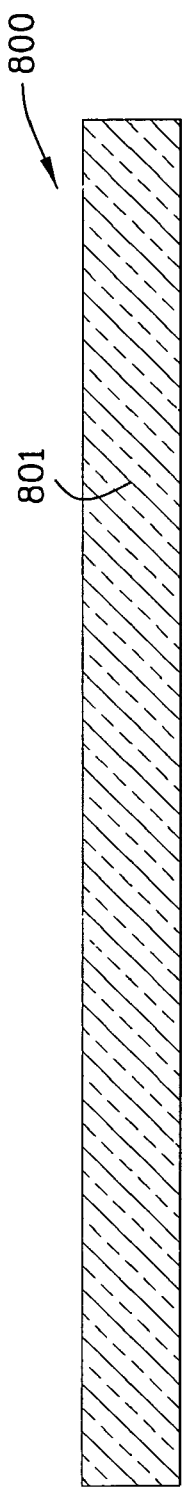
FIG. 8 is a cross-sectional schematic of a SiC top plate with a mask applied thereto.
Figure 8A:
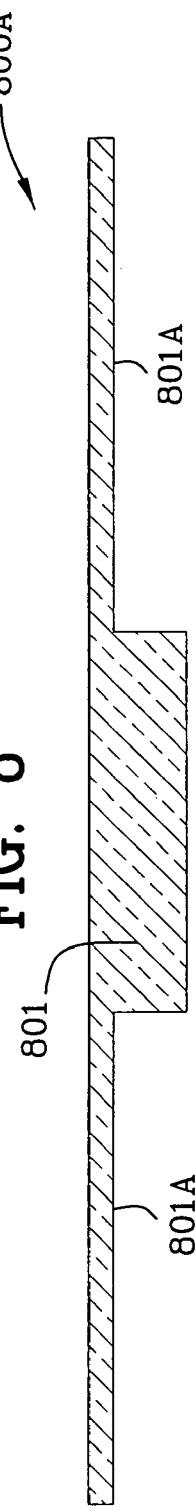
FIG. 8A is cross-sectional schematic similar to that of FIG. 8 with the underside of the top plate having been etched.
Figure 8B:
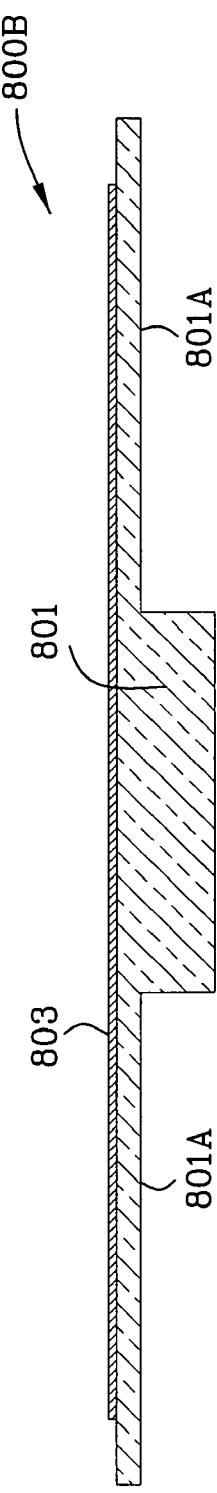
FIG. 8B is a cross-sectional schematic similar to that of FIG. 8A with a layer of nickel applied to the upper portion thereof. Alternatively, the top plate may be doped so that it is conductive.
Figure 8C:
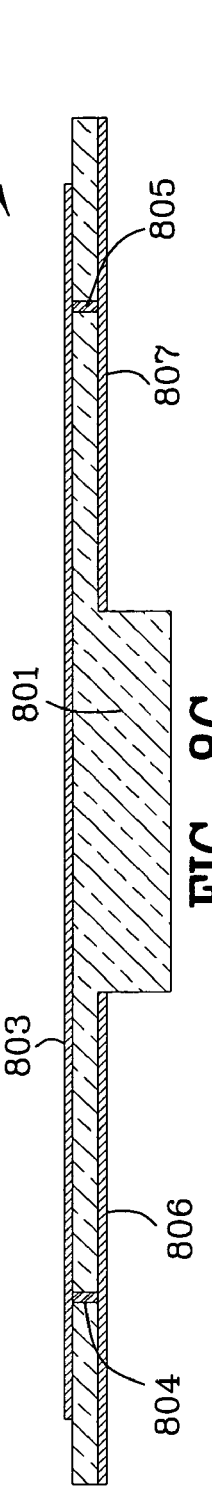
FIG. 8C is a cross-sectional schematic of top plate including additional nickel plating and connections between the nickel plates.

FIG. 8 is a cross-sectional schematic 800 of a SiC top plate 801 with a mask 802 applied thereto. FIG. 8A is cross-sectional schematic 800A similar to that of FIG. 8 with the underside 801A of the top plate having been etched. FIG. 8B is a cross-sectional schematic 800B similar to that of FIG. 8A with a layer of nickel 803 applied to the upper portion thereof. Alternatively, the top plate may be doped so that it is conductive. FIG. 8C is a cross-sectional schematic of the top plate 801 including additional nickel plating 806, 807 and connections 804, 805 between the nickel plates.

Figures 9B, 9C:
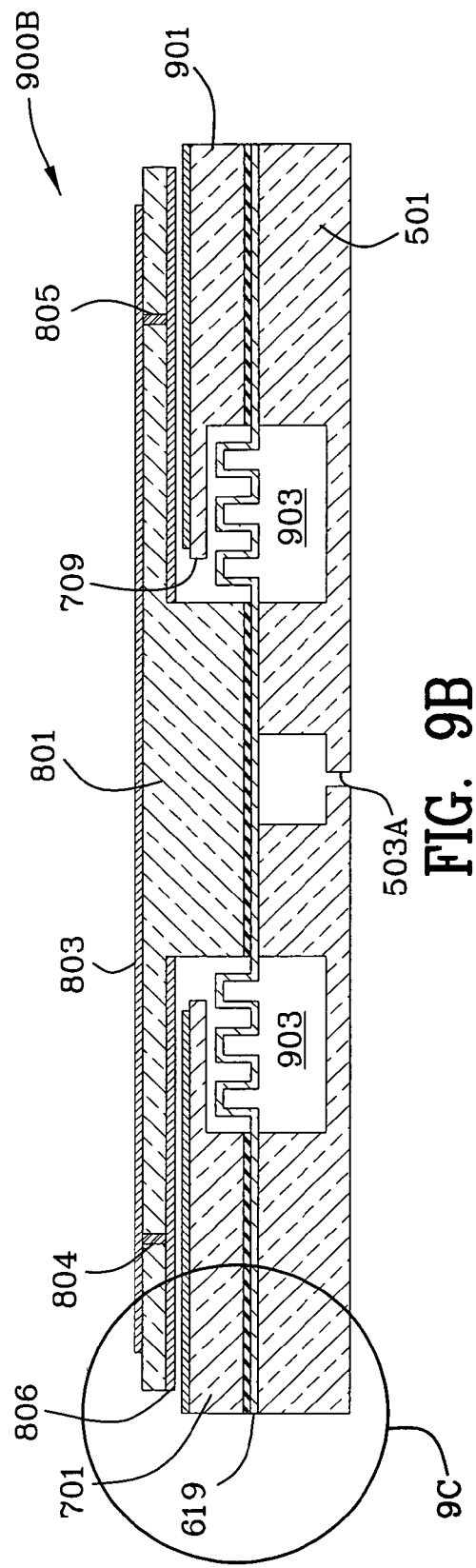
FIG. 9B is a cross-sectional schematic of the cylinder of the top plate secured to an insulator which in turn is secured to the diaphragm.
FIG. 9C illustrates an enlarged portion of FIG. 9B.
Figure 9D:
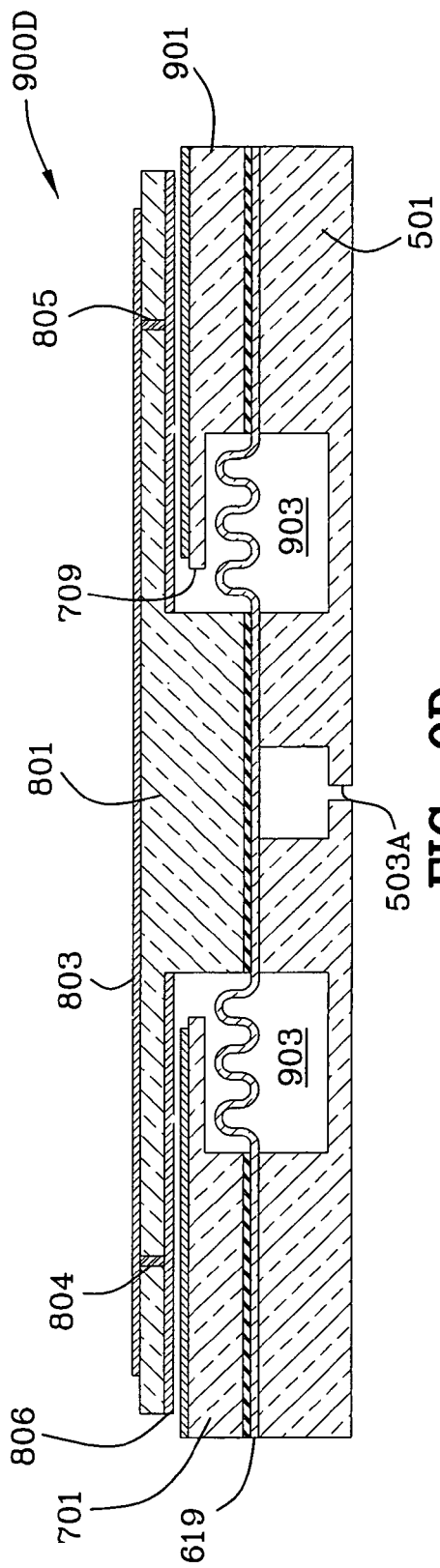
FIG. 9D illustrates an assembled actuator employing a sinusoidally shaped diaphragm.

FIG. 9 is a cross-sectional schematic 900 of a SiC diaphragm 619 secured/bonded to the first portion 501 of the SiC housing. FIG. 9A is a cross-sectional schematic 900A of the SiC diaphragm 619 secured to an insulator 901 by NiCuSil or TiCuSil adhesive which is in turn secured by the adhesive 902 to the second upper portion 701 of the SiC housing. Valve seat 520, 521 and passageway 503A are indicated in FIG. 9 as is the radially extending chamber 903. FIG. 9B is a cross-sectional schematic 900B of the cylinder 801 of the top plate secured to an insulator by the adhesive NiCuSil/TiCuSil which in turn is secured to the diaphragm 619. As such, FIG. 9B illustrates the assembled actuator operated microvalve. FIG. 9C illustrates an enlarged portion 900C of FIG. 9B. Gap 910 is illustrated between electrostatic plates 707 and 806. FIG. 9D illustrates an assembled actuator 900D employing a sinusoidally shaped diaphragm.

Figure 10:
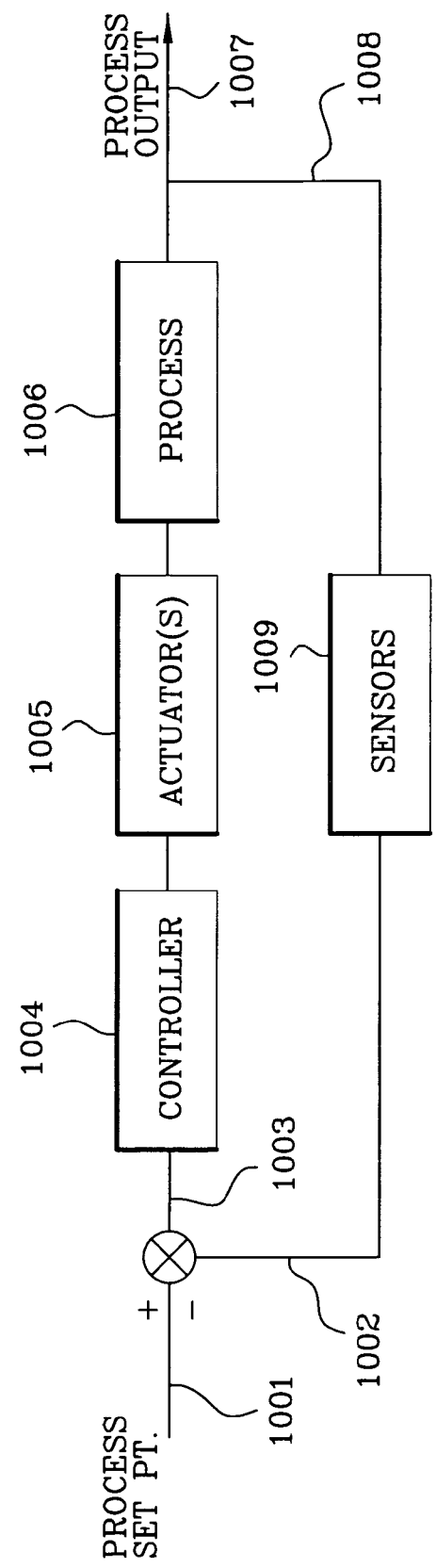
FIG. 10 is a schematic of a control system which incorporates the use of an actuator operated microvalve of this invention.

FIG. 10 is a schematic of a control system 1000 which incorporates the use of an actuator operated microvalve of this invention. Process set point 1001 is compared to the output 1002 of the process sensor 1002. It will be understood by those skilled in the art that a plurality of sensors may feedback a plurality of process measurements which are then compared to a plurality of setpoints. In this way combustion control can be accomplished on a distributed basis. An error signal 1003 is generated by the comparator and the error signal is then inputted into the controller 1004. Controller 1004 then acts upon this error signal according to an algorithm(s) and then an output signal is forwarded to the actuator operated microvalves 1005 as described previously herein above. The actuators then output the correct quantity of fuel into different locations of the combustion process 1006. The frequency response of the actuators is good enabling fast response times to add more or less fuel in the areas desired. The process is continuously generating various physical parameters such as flow, temperature, pressure etc. each of which may be sent back 1008 to the comparator to generate a plurality of error signals each of which may be acted upon by the controller. The actuator operated microvalves can receive voltage pulses or they can receive analog (continuous) signals. The algorithm used in the controller may be proportional plus integral plus derivative depending on the parameter being fed back to the comparator for the generation of the error signal.

Figure 11:
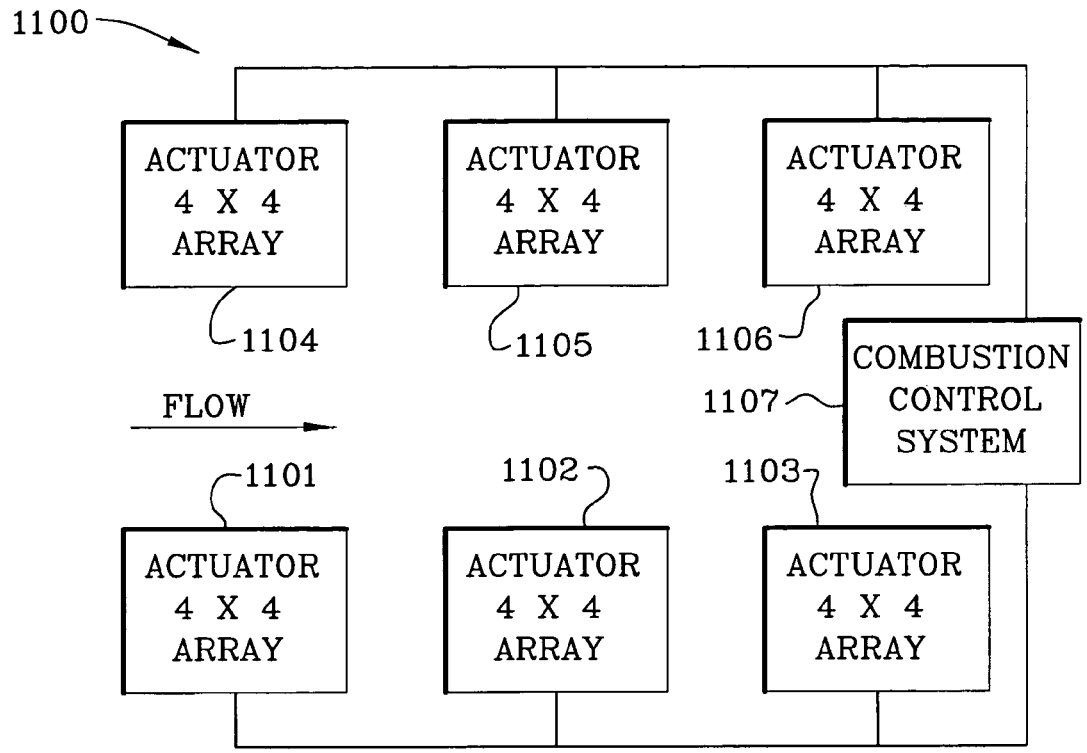
FIG. 11 is a schematic of a spatially oriented combustion control system employing arrays of the actuator operated microvalves of this invention.

FIG. 11 is a schematic 1100 of a spatially oriented combustion control system employing arrays 1101, 1102, 1103, 1104, 1105, 1106 of the actuator operated microvalves of this invention. The arrays may, for instance, be arranged in 4 by 4 groupings or they may be arranged in 7 by 7 groupings as desired by the combustion process designer. A combustion controller 1107 distributes control signals to the respective array and these signals may be addressable for operation of the specific microvalves of an array.

Figure 12:
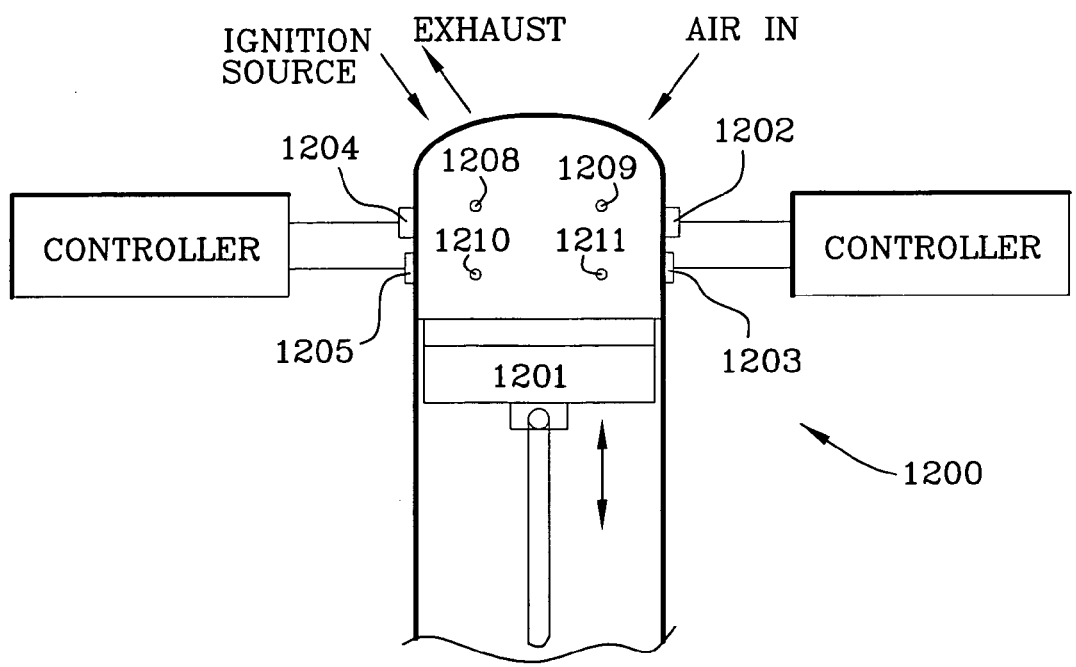
FIG. 12 is a schematic representation of a piston and actuator operated microvalves of this invention shown located therein.

FIG. 12 is a schematic representation 1200 of a piston 1201 and actuator operated microvalves 1202, 1203, 1204, 1205 of this invention shown located therein. Reference numerals 1208, 1209 are views, for example, of the outputs of the individual microvalves. Reference numerals 1210 and 1211 may be sensors employing MEMS based technology to measure parameters within the cylinder. Controllers 1206, 1207 drive the actuator operated microvalves to admit more or less fuel in certain positions of the cylinder. Controllers 1206, 1207 may interact with other cylinders to add or subtract torque applied to the crankshaft to reduce vibration and/or to minimize pollutants such as Carbon Monoxide and Oxides of Nitrogen.

Figure 13:
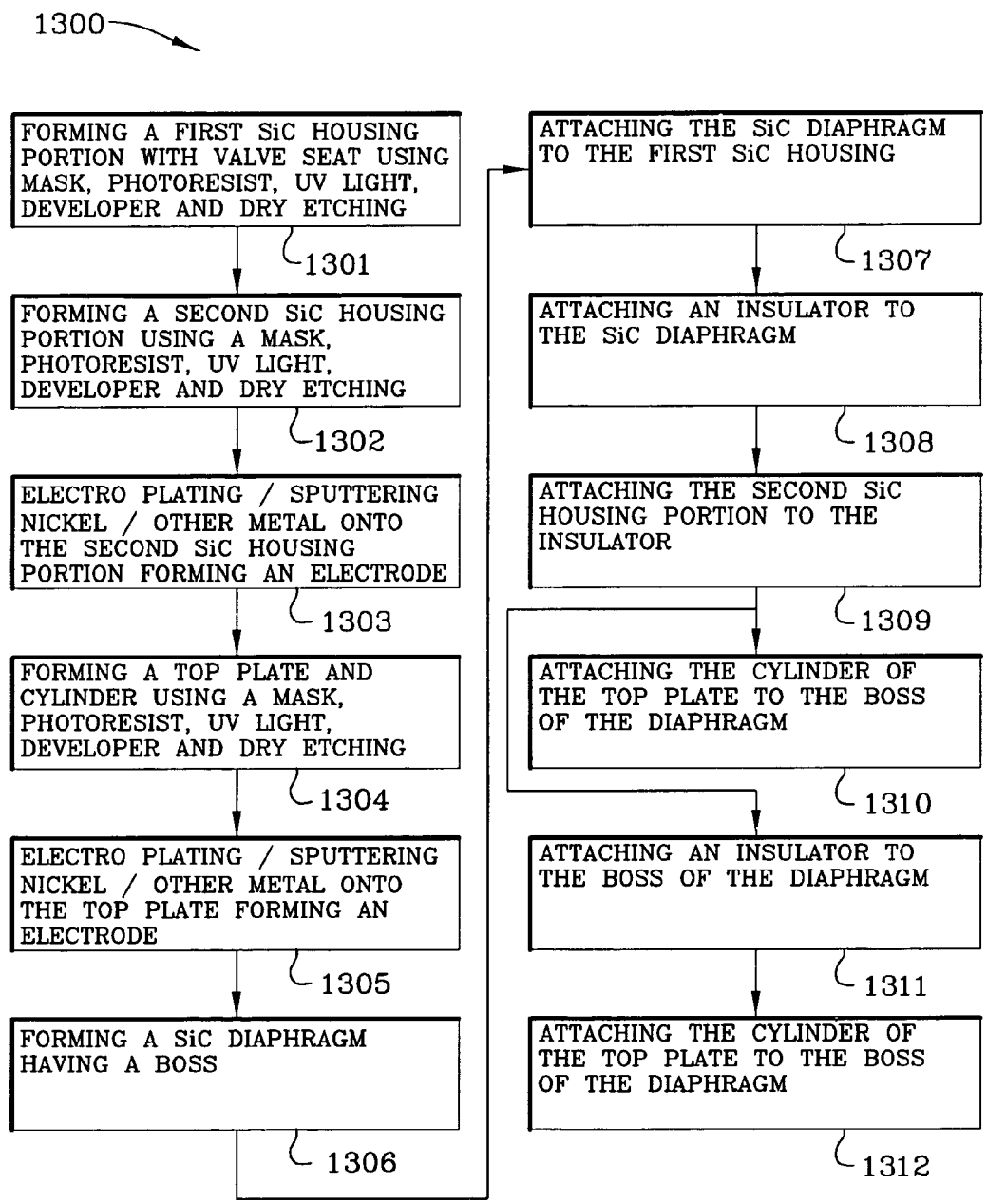
FIG. 13 is a flow diagram for manufacturing the actuator operated microvalve of this invention.

FIG. 13 is a flow diagram 1300 for manufacturing the actuator operated micro valve of this invention. The first step is forming 1301 a first lower portion of the SiC housing with a valve seat using a mask, photoresist, UV light, developer and dry etching; forming 1302 a second upper portion of the SiC housing a mask, photoresist, UV light, developer and dry etching; electroplating/sputtering 1303 nickel or other metal onto the second upper portion of the SiC housing forming an electrode or electrostatic plate; forming 1304 a top plate and cylinder using a mask, photoresist, UV light, developer and dry etching; electroplating/sputtering 1305 nickel or other metal onto the top plate forming an electrode or electrostatic plate; forming 1306 a SiC diaphragm having a boss; attaching 1307 the SiC diaphragm to the first SiC housing; attaching 1308 an insulator to the SiC diaphragm; attaching 1309 the second upper portion of the SiC housing to the insulator; attaching 1310 the cylinder of the top plate to the boss of the diaphragm; attaching 1311 an insulator to the boss of the diaphragm; and, attaching 1312 the cylinder of the top plate to the boss of the diaphragm.

Figure 14:
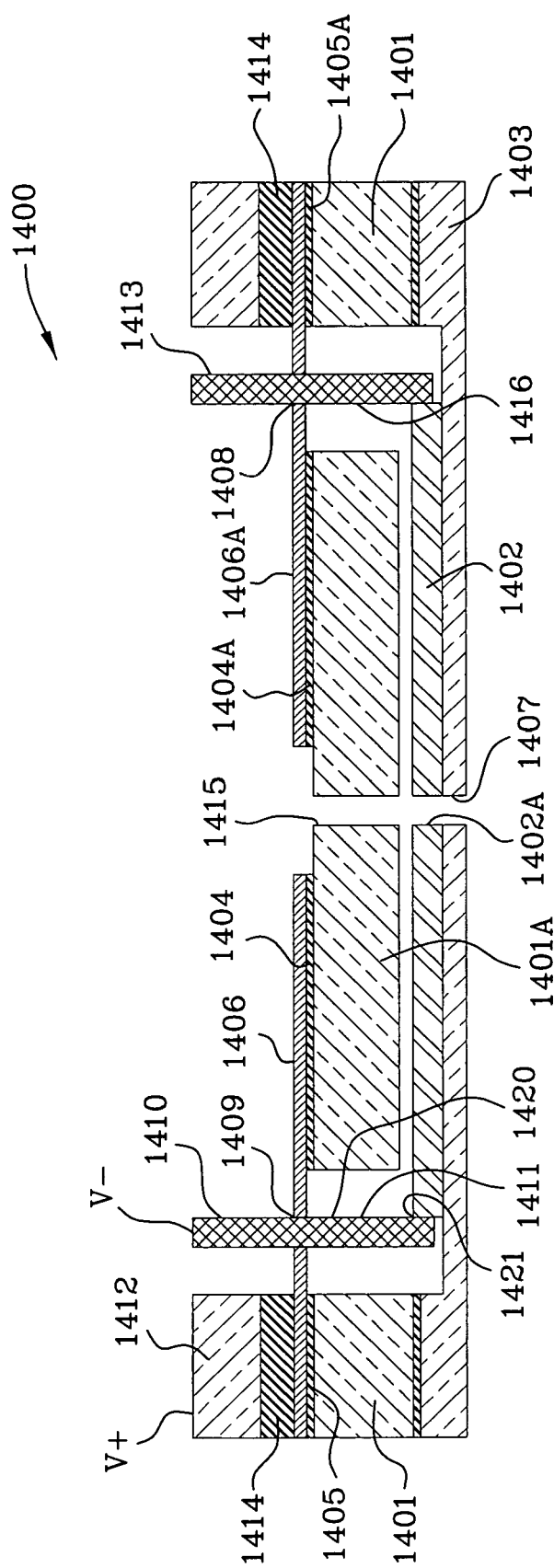
FIG. 14 is a schematic representation of another embodiment of an actuator operated microvalve.
Figure 6F:
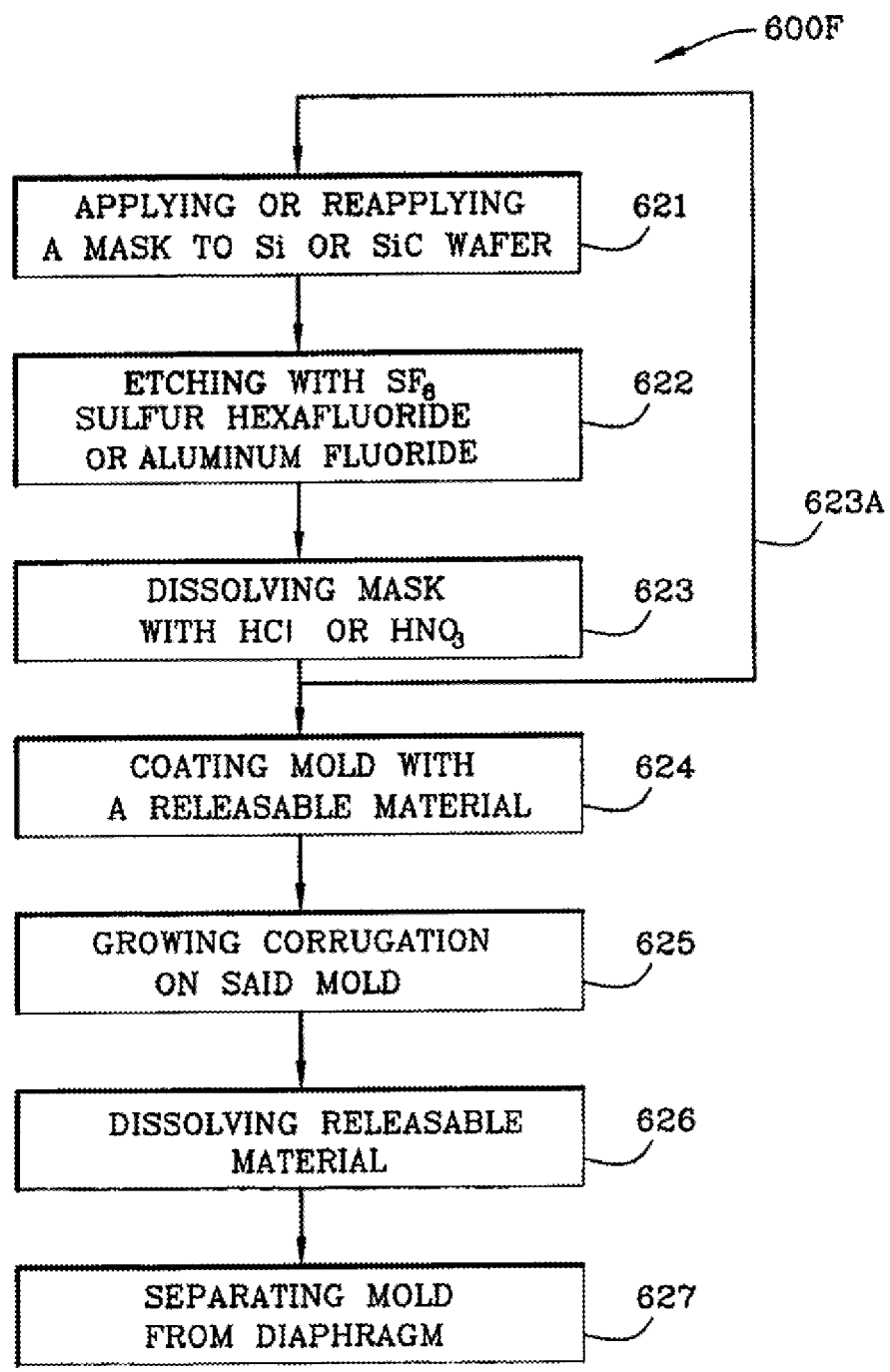

FIG. 14 is a schematic representation 1400 of another embodiment of an actuator operated microvalve. A SiC body 1403 includes an aperture 1407 therein. A slide 1402 includes aperture 1402A therein. Slide 1402 is preferably Nickel and sits atop the body 1403 and in the first open position the aperture 1402A of the slide is aligned with the aperture 1407 of the body 1403. A SiC substrate 1401 is bonded to the body 1403 at the outer peripheries thereof. Substrate 1401 also includes an inner portion 1401A having an aperture 1415 therein. Aperture 1415 is aligned with aperture 1402A and aperture 1407. The inner portion 1401A is stationary and is always aligned with aperture 1407 of the body 1403. Adhesive 1404A is affixed to the inner portion 1401A of the SiC substrate. Nickel plate 1406, 1406A is secured to the SiC substrate by adhesive 1404, 1404A, 1405, 1405A. Nickel plate 1406, 1406A bridges the inner portion 1401A and the outer portion 1401 of the SiC substrate. An insulator 1414 sits atop the outer portion of the Nickel plate 1406, 1406A. Doped SiC 1412 sits atop and is secured to the insulator 1414.

Still referring to FIG. 14, a lever 1420 includes a pulling portion 1410 and a pushing portion 1411. It will be noted that the pulling portion 1410 is shorter in length than the pushing portion 1411. Reference numeral 1409 denotes a fulcrum which is formed in Nickel plate 1406. The fulcrum 1409 is an aperture in the plate 1406. The lever 1420 is press fit into fulcrum 1409. Reference numeral 1421 denotes contact between the lever 1420 and the sliding plate 1402. Symbols V$^+$ and V$^-$ indicate the polarity of the doped SiC 1412 and the lever 1402. As described previously hereinabove, when the electrostatic plates have a potential difference between them they are drawn together. Since the pulling portion 1410 of the lever 1420 is shorter than the pushing portion 1411 of the lever 1420, a mechanical advantage is realized and the pushing portion 1411 moves a larger amount than the pulling portion 1410. Therefore, for small voltage changes and lower power usage the action of the lever magnifies the movement of the pushing portion 1411. Further, reference numeral 1421 pushes against the slide 1402 pushing the respective apertures 1402A and 1407 out of alignment tending to close the microvalve. Slide 1402 can be thought of as the valve.

Still referring to FIG. 14, reference numerals 1413, 1416 illustrate a post which is press fit within the Nickel plate 1406A. As slide 1402 is urged rightwardly the bottom 1416 of the post is urged rightwardly as well which tends to buckle Nickel plate 1406A. Buckling of Nickel plate 1406A stores energy and provides a resistive force on slide 1402 which tends to urge slide 1402 leftwardly which in turn tends to align the apertures.

Although this invention has been described by way of example and with particularity and specificity, those skilled in the art will recognize that many changes and modifications may be made without departing from the spirit and scope of the invention defined by the Claims which follow hereinbelow.

I claim:

1. A microvalve comprising a SiC housing, said SiC housing includes a first lower portion and a second upper portion, said first lower portion of said housing includes a passageway therethrough and a microvalve seat, a moveable SiC diaphragm, said SiC diaphragm includes a centrally located boss, and, when said boss of said SiC diaphragm interengages said valve seat communication of fluid through said passageway is prohibited.

2. A microvalve as claimed in claim 1 wherein said SiC diaphragm includes at least one corrugation.

3. A microvalve as claimed in claim 1 wherein said SiC diaphragm includes a plurality of corrugations.

4. A microvalve as claimed in claim 3 wherein said corrugations are sinusoidally shaped.

5. A microvalve as claimed in claim 3 wherein said corrugations are square-wave shaped.

6. A microvalve as claimed in claim 3 wherein said corrugations are polygonally shaped.

7. A microvalve as claimed in claim 3 wherein said second upper portion of said SiC housing includes a central recess therein.

8. A microvalve as claimed in claim 3 wherein said corrugations extend radially outwardly from said boss.

9. An actuator operated microvalve, said microvalve comprising: a SiC housing, said SiC housing includes a first lower portion and a second upper portion, said lower portion of said housing includes a passageway therethrough and a microvalve seat, a moveable SiC diaphragm, said SiC diaphragm includes a centrally located boss and radially extending corrugations, and, said boss of said SiC diaphragm moves in a range of positions between a closed position wherein said boss interengages said microvalve seat prohibiting communication of fluid through said passageway and a fully open position when said boss is spaced apart from said seat at its maximum permitting communication of fluid through said passageway; said actuator comprising: a SiC top plate affixed to said boss, said top plate includes a first electrode upon which a first voltage is impressed, and, said second upper portion of said SiC housing further includes a second electrode upon which a second voltage is impressed; and, said first electrode and hence said top plate being attracted toward said second electrode and hence said second upper portion of said housing when a voltage difference between said electrodes exists urging said boss of said diaphragm toward said valve seat and said closed position.

10. An actuator operated microvalve as claimed in claim 9 wherein said first electrode is a nickel plate affixed to said top plate and said second electrode is a nickel plate.

11. An actuator operated microvalve as claimed in claim 9 wherein said top plate is doped to be conductive and said doped top plate constitutes said first electrode and said second electrode is a nickel plate.

12. An actuator operated microvalve as claimed in claim 11 wherein said top plate includes a cylindrical portion and wherein an insulator is affixed to said boss of said diaphragm and said cylindrical portion of said top plate.

13. An actuator operated microvalve as claimed in claim 9 wherein said attraction of said top plate and said second upper portion of said SiC housing is dependent on the magnitude of the voltage difference.

14. An actuator operated microvalve as claimed in claim 9 wherein said corrugations are sinusoidally shaped.

15. An actuator operated microvalve as claimed in claim 9 wherein said corrugations are square wave shaped.

16. An actuator operated microvalve as claimed in claim 9 wherein said corrugations are polygonally shaped.

17. An actuator operated microvalve as claimed in claim 9 wherein said second upper portion of said SiC housing includes a central recess therein.

18. An actuator operated microvalve as claimed in claim 9 wherein an insulator is positioned between said diaphragm and said second upper portion of the SiC housing.

19. An actuator operated microvalve, said microvalve comprising: a Si housing, said housing includes a first lower portion and a second upper portion, said lower portion of said Si housing includes a passageway therethrough and a microvalve seat, a moveable Si diaphragm, said Si diaphragm includes a centrally located boss and radially extending corrugations, and, said boss of said Si diaphragm moves in a range of positions between a closed position wherein said boss interengages said microvalve seat prohibiting communication of fluid through said passageway and a fully open position when said boss is spaced apart from said seat at its maximum permitting communication of fluid through said passageway; said actuator comprising: a Si top plate affixed to said boss, said top plate includes a first electrode upon which a first voltage is impressed, and, said second upper portion of said Si housing further includes a second electrode upon which a second voltage is impressed; and, said first electrode and hence said top plate being attracted toward said second electrode and hence said second upper portion of said housing when a voltage difference between said electrodes exists urging said boss of said diaphragm toward said valve seat and said closed position.

20. An actuator operated microvalve as claimed in claim 19 wherein said first electrode is a nickel plate affixed to said top plate and said second electrode is a nickel plate.

21. An actuator operated microvalve as claimed in claim 19 wherein said top plate is doped to be conductive and said doped top plate constitutes said first electrode and said second electrode is a nickel plate.

22. An actuator operated microvalve as claimed in claim 21 wherein said top plate includes a cylindrical portion and wherein an insulator is affixed to said boss of said diaphragm and said cylindrical portion of said top plate.

23. An actuator operated microvalve as claimed in claim 19 wherein said attraction of said top plate and said second upper portion of said Si housing is dependent on the magnitude of the voltage difference.

24. An actuator operated microvalve as claimed in claim 19 wherein said corrugations are sinusoidally shaped.

25. An actuator operated microvalve as claimed in claim 19 wherein said corrugations are square wave shaped.

26. An actuator operated microvalve as claimed in claim 19 wherein said corrugations are polygonally shaped.

27. An actuator operated microvalve as claimed in claim 19 wherein said second upper portion of said Si housing includes a central recess therein.

28. An actuator operated microvalve as claimed in claim 19 wherein an insulator is positioned between said diaphragm and said second upper portion of the Si housing.

29. An actuator operated microvalve as claimed in claim 9 wherein said first and second electrodes are electrostatic plates.

30. An actuator operated microvalve as claimed in claim 19 wherein said first and second electrodes are electrostatic plates.

31. An actuator operated microvalve as claimed in claim 9 in combination with a closed loop combustion control system wherein the first voltage with respect to the second voltage is modulated using a square wave voltage.

32. An actuator operated microvalve as claimed in claim 19 in combination with a closed loop combustion control system wherein the first voltage with respect to the second voltage is modulated using a square wave voltage.

33. An actuator operated microvalve as claimed in claim 9 in combination with a closed loop combustion control system wherein the first voltage with respect to the second voltage is continuously modulated by an analog signal.

34. An actuator operated microvalve as claimed in claim 19 in combination with a closed loop combustion control system wherein the first voltage with respect to the second voltage is continuously modulated by an analog signal.

35. An actuator operated microvalve as claimed in claim 31 wherein the combustion control system includes an algorithm.

36. An actuator operated microvalve as claimed in claim 32 wherein the combustion control system includes an algorithm.

37. An actuator operated microvalve as claimed in claim 33 wherein the combustion control system includes an algorithm.

38. An actuator operated microvalve as claimed in claim 34 wherein the combustion control system includes an algorithm.

39. An actuator operated microvalve as claimed in claim 35 wherein said algorithm is a proportional plus integral plus derivative algorithm.

40. An actuator operated microvalve as claimed in claim 36 wherein said algorithm is a proportional plus integral plus derivative algorithm.

41. An actuator operated microvalve as claimed in claim 37 wherein said algorithm is a proportional plus integral plus derivative algorithm.

42. An actuator operated microvalve as claimed in claim 37 wherein said algorithm is a proportional plus integral plus derivative algorithm.

43. A SiC diaphragm comprising a cylindrical central boss portion having a thickness, radially extending corrugations having a peak to peak amplitude, and a radially extending planar portion having a thickness; said thickness of said cylindrical central boss and said thickness of said radially extending planar portion being less than said peak to peak amplitude of the radially extending corrugations.

44. A SiC diaphragm as claimed in claim 43 wherein said corrugations are sinusoidally shaped.

45. A SiC diaphragm as claimed in claim 43 wherein said corrugations are square wave shaped.

46. A SiC diaphragm as claimed in claim 43 wherein said corrugations are polygonally shaped.

47. A Si diaphragm comprising a cylindrical central boss portion having a thickness, radially extending corrugations having a peak to peak amplitude, and a radially extending planar portion having a thickness, said thickness of said cylindrical central boss and said thickness of said radially extending planar portion being less than said peak to peak amplitude of the radially extending corrugations.

48. A Si diaphragm as claimed in claim 47 wherein said corrugations are sinusoidally shaped.

49. A Si diaphragm as claimed in claim 47 wherein said corrugations are square wave shaped.

50. A Si diaphragm as claimed in claim 47 wherein said corrugations are polygonally shaped.

* * * * *

UNITED STATES PATENT AND TRADEMARK OFFICE
CERTIFICATE OF CORRECTION

PATENT NO. : 7,438,030 B1 Page 1 of 2
APPLICATION NO. : 11/213604
DATED : October 21, 2008
INVENTOR(S) : Okojie It is certified that error appears in the above-identified patent and that said Letters Patent is hereby corrected as shown below:

Delete Drawing Sheet 13, and replace with Drawing Sheet 13. (attached)

Col. 15, line 21, after "operated" delete "micro valve" and insert --microvalve--.

Signed and Sealed this

Second Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,438,030 B1
APPLICATION NO. : 11/213604
DATED : October 21, 2008
INVENTOR(S) : Okojie Page 1 of 1

It is certified that error appears in the above-identified patent and that said Letters Patent is hereby corrected as shown below:

In the DRAWINGS as filed, in box 622 of Fig. 6F after "OR" Delete "NF3 ALUMINUM" and insert --AMMONIUM--

Signed and Sealed this

Thirteenth Day of October, 2009

David J. Kappos
*Director of the United States Patent and Trademark Office*